(12) United States Patent
Shi et al.

(10) Patent No.: US 11,454,513 B2
(45) Date of Patent: Sep. 27, 2022

(54) METHOD AND APPARATUS FOR GENERATING ROAD NETWORK DATA OF INTERSECTION AREA

(71) Applicant: HUAWEI TECHNOLOGIES CO., LTD., Guangdong (CN)

(72) Inventors: Feng Shi, Beijing (CN); Jun Wang, Shanghai (CN); Jingwei Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/861,997

(22) Filed: Apr. 29, 2020

(65) Prior Publication Data
US 2020/0256698 A1    Aug. 13, 2020

Related U.S. Application Data

(63) Continuation of application No. PCT/CN2019/070128, filed on Jan. 2, 2019.

(30) Foreign Application Priority Data

Nov. 3, 2017 (CN) .......................... 201711068004.3

(51) Int. Cl.
*G01C 21/36* (2006.01)
(52) U.S. Cl.
CPC ................... *G01C 21/3691* (2013.01)
(58) Field of Classification Search
CPC ............................................. G01C 21/00–3896
See application file for complete search history.

(56) References Cited

U.S. PATENT DOCUMENTS 6,338,021 B1 * 1/2002 Yagyu ................ G01C 21/3461
340/990
2001/0012981 A1    8/2001 Yamashita et al.
(Continued)

FOREIGN PATENT DOCUMENTS

CN        1576792 A    2/2005
CN      101149268 A    3/2008
(Continued)

OTHER PUBLICATIONS

PCT International Search Report and Written Opinion issued in International Application No. PCT/CN2019/070128 dated Mar. 29, 2019, 18 pages (with English translation).
(Continued)

*Primary Examiner* — Aaron L Troost
(74) *Attorney, Agent, or Firm* — Fish & Richardson P.C.

(57) ABSTRACT

This application provides a method and an apparatus for generating road network data of an intersection area, and the intersection area connects a plurality of roads. The method includes: obtaining data of a road link of each of the plurality of roads, where the road link includes an entry link and an exit link; calculating coordinates of an intersection point of an extension line of the entry link of each road and an extension line of an exit link of a neighboring road based on the data of the road link of each of the plurality of roads, where the coordinates of the intersection point are coordinates of an intersection node; and the neighboring road is a road counterclockwise adjacent to the road; or the neighboring road is a road clockwise adjacent to the road, where two intersection nodes in sequence are endpoints of an intra-intersection link.

9 Claims, 24 Drawing Sheets

(56) References Cited

U.S. PATENT DOCUMENTS

| | | | | |
|---|---|---|---|---|
| 2004/0068369 | A1* | 4/2004 | Kim | G01C 21/3632 701/437 |
| 2011/0054783 | A1* | 3/2011 | Kishikawa | G06F 16/29 701/533 |
| 2013/0249938 | A1* | 9/2013 | Yamamoto | G08G 1/09626 345/619 |
| 2016/0098496 | A1* | 4/2016 | Joshi | G01C 21/3867 703/1 |
| 2017/0045370 | A1 | 2/2017 | Weiland et al. | |
| 2020/0378788 | A1* | 12/2020 | Fujita | G09B 29/00 |

FOREIGN PATENT DOCUMENTS

| | | |
|---|---|---|
| CN | 101162154 A | 4/2008 |
| CN | 102057402 A | 5/2011 |
| CN | 103092949 A | 5/2013 |
| CN | 104899357 A | 9/2015 |
| CN | 106709126 A | 5/2017 |
| CN | 106886604 A | 6/2017 |
| CN | 107014387 A | 8/2017 |
| EP | 1411486 A2 | 4/2004 |
| EP | 1489383 B1 | 1/2010 |
| JP | 2005010732 A | 1/2005 |
| JP | 2005037329 A * | 2/2005 |
| JP | 2014021093 A | 2/2014 |

OTHER PUBLICATIONS

Extended European Search Report issued in European Application No. 19721184.0 dated Mar. 5, 2021, 8 pages.

Office Action issued in Chinese Application No. 201711068004.3 dated May 18, 2022, 8 pages.

* cited by examiner

METHOD AND APPARATUS FOR GENERATING ROAD NETWORK DATA OF INTERSECTION AREA

CROSS-REFERENCE TO RELATED APPLICATIONS

This application is a continuation of International Application No. PCT/CN2019/070128, filed on Jan. 2, 2019, which claims priority to Chinese Patent Application No. 201711068004.3, filed on Nov. 3, 2017. The disclosures of the aforementioned applications are hereby incorporated by reference in their entireties.

TECHNICAL FIELD

The present invention relates to a map data generation method, and in particular, to a method and an apparatus for generating road network data of an intersection area that are applicable to a plurality of types of intersections.

BACKGROUND

Intelligent assistant driving is to enter people's life in five to ten years, and therefore a high-precision electronic map needs to be used as priori data, to perform environment perception in combination with a vehicle-mounted sensor, so as to provide a control basis of automatic driving. In particular, centimeter-level high-precision electronic map data is more important for automatic driving planning and control beyond a sensing distance range of the vehicle-mounted sensor or in a scenario in which a sensing system has an insufficient sensing capability.

A process of generating an electronic map from collected sensor data of a real surface feature is an important step in an electronic map product generation process. For automatic driving and intelligent assistant driving, generation efficiency and application efficiency of map data are particularly important, and an update delay of path planning is also a key indicator of map performance. During generation of the map data, road network data needs to be generated to represent traffic relationships between roads and between lanes. According to a standard recommended by a related industry association, for an automatic real-time requirement, a minimum quantity of request times for the road network data should be greater than two times/second during path planning, that is, a response delay is less than 500 ms.

During path planning, all nodes and links between a node corresponding to a departure place and a node corresponding to a destination need to be traversed until the node corresponding to the destination is reached, to obtain at least one path from the departure place to the destination. Therefore, a path planning delay is related to a quantity of nodes and links in the road network data.

In a real scenario, there is a plurality of multi-way intersections in a road network of a city. However, in an intersection area, there is no information such as a marking used as an effective basis for generating road network data of the intersection area. For a multi-way intersection, an existing traversal connection method and an extension method cause a sharp increase in a quantity, of intersection nodes and intra-intersection links in road-level road network data of the intersection area, increasing a time for path planning. Consequently, time validity of path planning cannot be met, and a volume of the road network data is increased. In addition, when there is an excessively large quantity of intra-intersection links in the intersection area, a positioning point cannot match an intra-intersection link through simple calculation during spatial positioning, and calculation complexity needs to be increased to ensure positioning quality, but a delay of a positioning module is increased.

SUMMARY

This application provides a method and an apparatus for generating road network data of an intersection area, to satisfy time validity of road network data, of an intersection area, used for path planning, decrease a volume of the road network data, and improve delay performance of a road network data request.

According to a first aspect, this application provides a method for generating road network data of an intersection area, where the intersection area connects a plurality of roads, and the method includes the following steps:

Data of a road link of each of the plurality of roads is obtained, where the road link includes an entry link and an exit link, and the data of the road link includes coordinates of points forming the road link; and specifically includes coordinates of an endpoint and a shape point forming the road link.

For example, for a five-way intersection area, data of a road link of each of five roads connected by a five-way intersection is obtained. Each road has at least one road link; and in the road link, a link entering an intersection is an entry link for the intersection, and a link exiting an intersection is an exit link for the intersection.

The road network data of the intersection area includes data of an intersection node and data of an intra-intersection link. The data of the intersection node in the intersection area and the data of the intra-intersection link in the intersection area are calculated based on the data of the road link of each of the plurality of roads, where the data of the intersection node includes coordinates of the intersection node, and the data of the intra-intersection link includes coordinates of endpoints of the intra-intersection link.

Specifically, coordinates of an intersection point of an extension line of the entry link of each road and an extension line of an exit link of a neighboring road are calculated, where the coordinates of the intersection point are the coordinates of the intersection node, and an extension line is an extension line of a link in the intersection area. Considering that different countries may have different traffic rules, including a left-hand traffic rule and a right-hand traffic rule, for the left-hand traffic rule, a vehicle runs on a left side of a road when running on the road; and for the right-hand traffic rule, a vehicle runs on a right side of a road when running on the road. For the right-hand traffic rule, the neighboring road is a road counterclockwise adjacent to the road; and for the left-hand traffic rule, the neighboring road is a road clockwise adjacent to the road. Two intersection nodes in sequence are the endpoints of the intra-intersection link.

For a path planning algorithm whose time complexity is $O((m+n)\log n)$ (m is a quantity of intra-intersection links, and n is a quantity of intersection nodes), there are relatively small quantities of intersection nodes and intra-intersection links in the road network data that is of the intersection area and that is generated through calculation, the road network data of the intersection area occupies relatively small space, and so that time complexity may be reduced when the road network data of the intersection area is used for path planning, thereby improving time validity of path planning and delay performance of a road network data request.

Based on the first aspect, in some implementations, the calculating coordinates of an intersection point of an extension line of the entry link of each road and an extension line of an exit link of a neighboring road includes:

making extension lines of the entry link and the exit link of each road in an intersection plane of the intersection area according to a course of the road, where the course of each road is a direction from a traffic center point of the road to a traffic center point in the intersection plane.

In other words, directions of the extension lines of the entry link and the exit link of each road in the intersection plane each are consistent with the course of the road. Specifically, direction angles of the extension lines of the entry link and the exit link of the road each are the same as a direction angle of the course of the road. A startpoint of the course of each road is the traffic center point of the road and an endpoint is a traffic center point in the intersection plane.

The intersection plane of the intersection area is a polygon calculated by using surface feature geometric data of the intersection area, and the polygon is considered as a mass-even polygon. The traffic center point may be an intersection point of the intersection plane and a merging line of road links of each road, or may be a midpoint of intersection points of the intersection plane and the road links of each road. The course of the road may be a ray from the traffic center point of the road to a traffic center point in the intersection plane.

Making the extension lines of the road links in the intersection plane according to the course may further resolve a problem that a road network of an intersection area fails to be generated because there may be no intersection point of direct extension lines of the road links or an intersection point of the extension lines of the road links may be not in the intersection plane. The method for generating a road network data of an intersection area that is applicable to a plurality of types of intersections is provided, and has relatively good adaptability to automatic generation of road network data of the plurality of types of intersections.

In another implementation, during the calculating coordinates of an intersection point of an extension line of the entry link of each road and an extension line of an exit link of a neighboring road, an extension line of a road link may be obtained by directly extending the road link in an original direction of the road link.

Based on the first aspect, in some implementations, the course of each road is a direction from the traffic center point of the road to a geometric gravity center of the intersection plane, and before the calculating coordinates of an intersection point of an extension line of the entry link of each road and an extension line of an exit link of a neighboring road, the method further includes:

obtaining surface feature geometric data of the intersection area, where the surface feature geometric data of the intersection area is geometric data of a surface feature in the intersection area, for example, coordinates of boundaries or endpoints of a traffic light, a road edge line, a traffic direction divider, and a stop line in the intersection area; and calculating the intersection plane of the intersection area based on the surface feature geometric data of the intersection area, and calculating coordinates of the geometric gravity center of the intersection plane; and calculating coordinates of the traffic center point of each road based on the data of the road link of the road.

The geometric gravity center of the intersection plane is a geometric gravity center of the polygon corresponding to the intersection plane, the polygon is segmented into a plurality of triangles through triangulation, and the geometric gravity center of the polygon is generated by calculating gravity centers of the triangles. When the calculated polygon of the intersection plane is a regular figure (such as a square and a regular triangle), a geometric center of the polygon is the geometric gravity center of the polygon.

In another implementation, the course of each road may alternatively be a direction from the traffic center point of the road to a point near the geometric gravity center of the intersection plane.

Based on the first aspect, in some implementations, when there is a main road and a service road in the road, the road link of the road is a road link of the main road in the road, and an extension line of a road link of the service road is a line extended from the road link of the service road to an intersection node on an extension line of the road link of the main road in the same road. Without increasing a quantity of intersection nodes, road types of the main road and the service road are considered, so that generated road-level road network data of the intersection area is more refined and accurate.

According to a second aspect, this application provides an apparatus for generating road network data of an intersection area, where the intersection area connects a plurality of roads, and the apparatus includes an obtaining unit and a road network calculation unit, where the obtaining unit is configured to obtain data of a road link of each of the plurality of roads, where the road link includes an entry link and an exit link; and the data of the road link includes coordinates of points forming the road link; and the road network calculation unit is configured to calculate data of an intersection node in the intersection area and data of an intra-intersection link in the intersection area based on the data of the road link of each of the plurality of roads, where the data of the intersection node includes coordinates of the intersection node, and the data of the intra-intersection link includes coordinates of endpoints of the intra-intersection link; and the road network calculation unit is specifically configured to:

calculate coordinates of an intersection point of an extension line of the entry link of each road and an extension line of an exit link of a neighboring road, where the coordinates of the intersection point are the coordinates of the intersection node, where two intersection nodes in sequence are the endpoints of the intra-intersection link.

Based on the second aspect, in some implementations, the road network calculation unit is specifically configured to:

make extension lines of the entry link and the exit link of each road in an intersection plane of the intersection area according to a course of the road, where the course of each road is a direction from a traffic center point of the road to a traffic center point in the intersection plane.

Based on the second aspect, in some implementations, the obtaining unit is further configured to obtain surface feature geometric data of the intersection area; and the apparatus further includes a course calculation unit, and the course calculation unit is configured to calculate the intersection plane of the intersection area based on the surface feature geometric data of the intersection area, and calculate coordinates of a geometric gravity center of the intersection plane; and calculate coordinates of the traffic center point of each road based on the data of the road link of the road, where the course of each road is a direction from the traffic center point of each road to the geometric gravity center of the intersection plane.

Based on the second aspect, in some implementations, when there is a main road and a service road in the road, the road link of the road is a road link of the main road in the road, and an extension line of a road link of the service road is a line extended from the road link of the service road to an intersection node on an extension line of the road link of the main road in the same road.

According to a third aspect, this application provides a computer system, and the computer system includes a processor and a memory. The memory is configured to store a computer program, and the processor is configured to read the computer program from the memory, and enable the apparatus to implement the method according to the first aspect and any one of the implementations of the first aspect.

According to a fourth aspect, this application provides a computer readable storage medium, the computer readable storage medium may be nonvolatile, and the computer readable storage medium stores a computer program used to implement the method according to any one of the implementations of the first aspect.

According to a fifth aspect, this application provides a computer program product, and the computer program product includes a computer program. When executing the computer program, a processor implements the method according to first aspect and any one of the implementations.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. In the descriptions of the embodiments of the present invention, unless otherwise stated, "a plurality of" means two or more.

Figure 5:
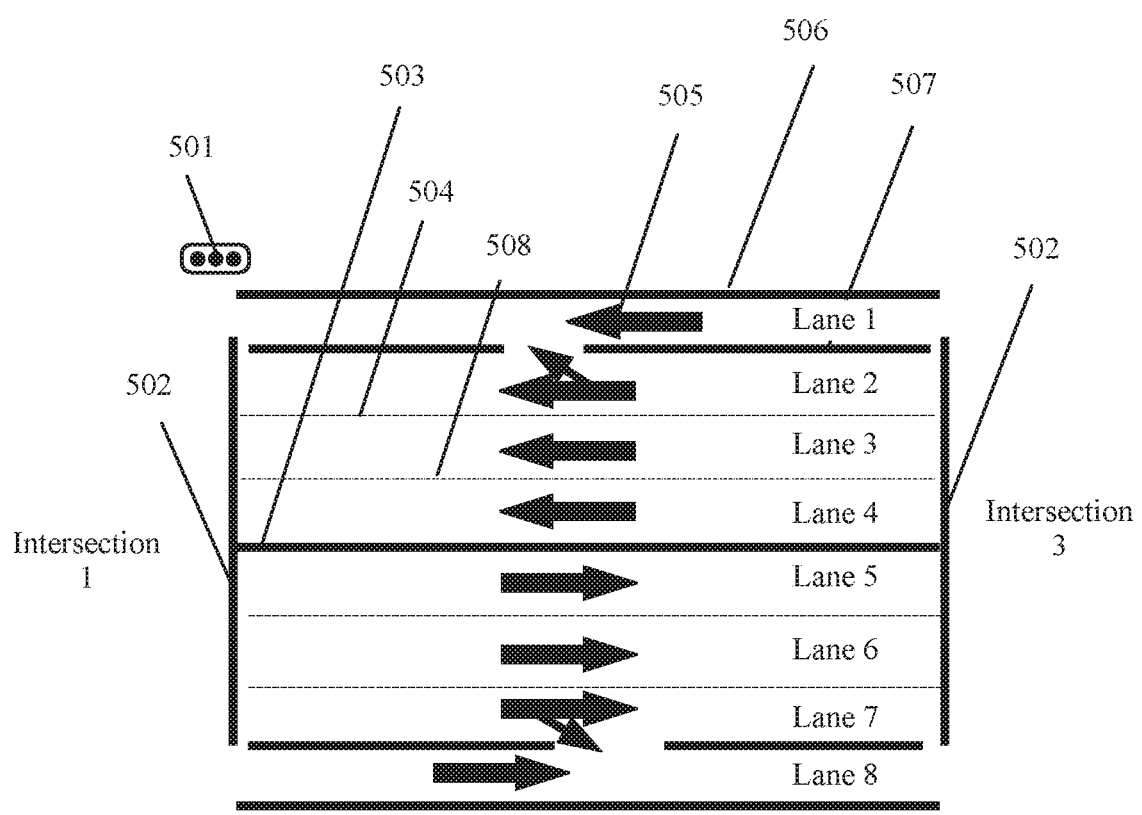
FIG. 5 is a schematic diagram of a road 3 according to an embodiment of the present invention.

Some key terms in this application are explained below:

A surface feature is a general term of various tangible objects (such as a mountain, forest, and a building) and intangible objects (such as a province boundary and a county boundary) on the ground, and is a relatively fixed object on the earth surface in a general sense. For example, a traffic light 501, a stop line 502, a traffic direction divider 503 (which may be an isolation strip or a pavement marking in reality), lane dividing lines 504 and 508, a pavement sign 505, a road edge line 506, and a main and service road divider 507 in FIG. 5 are all surface features. The surface feature may also be a pedestrian crossing, a suspending sign (such as speed limiting and forbidden information), a guard rail, and the like.

A road is a path between two adjacent intersections on which a motor vehicle can run. The road may have a single traffic direction or two opposite traffic directions, for example, roads 1 to 11 shown in FIG. 1. The road may include one or more lanes. The road may be divided into a main road and a service road, and the main road or the service road may include at least one lane.

A lane is a separated area for vehicles in single file to run on a road, for example, lanes 1 to 8 in FIG. 5.

Figure 1:
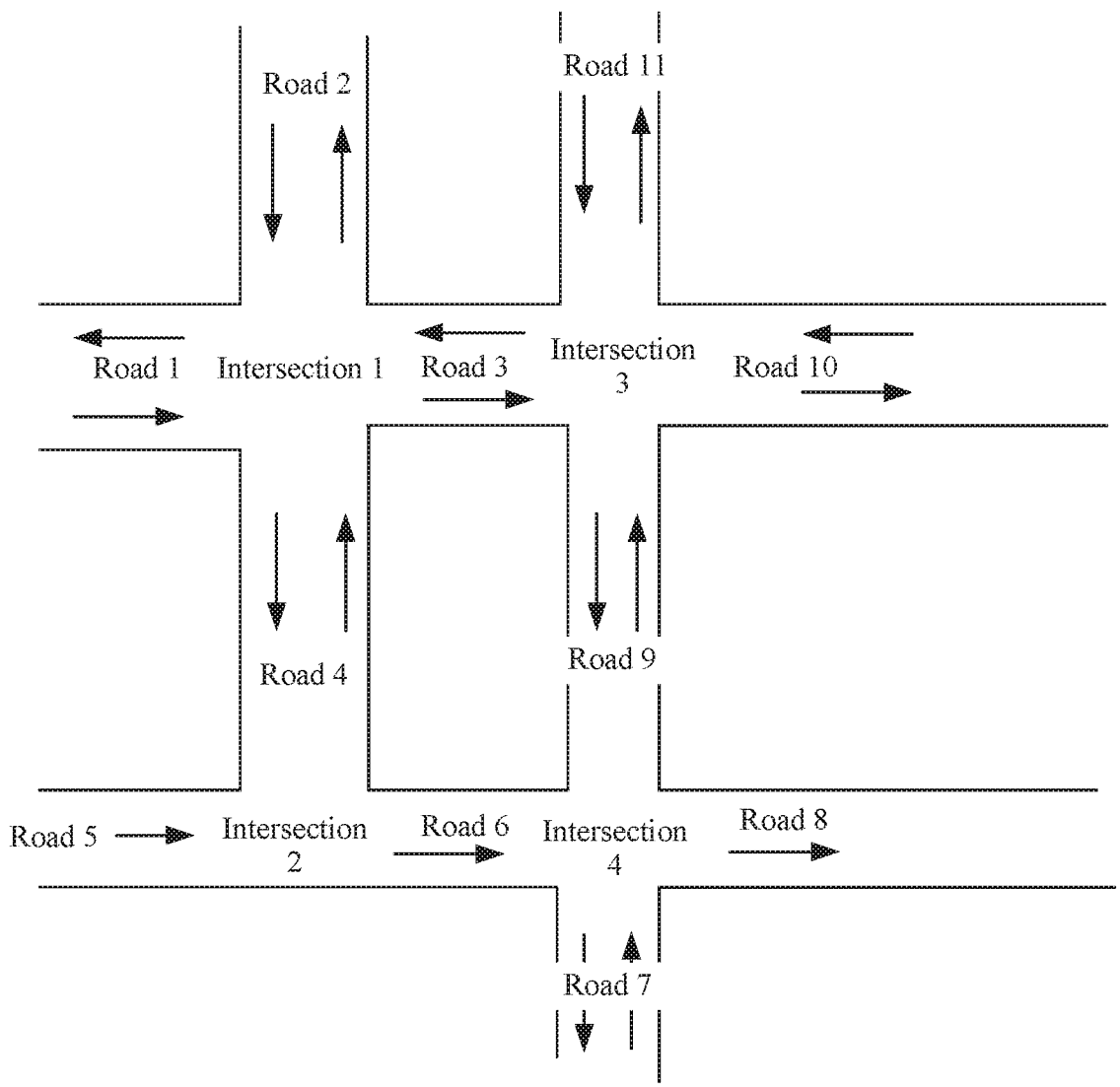
FIG. 1 is a schematic diagram of a traffic network in a real world according to an embodiment of the present invention.

An intersection is an area connecting different roads. As shown in FIG. 1, in an example of an intersection 1, the intersection 1 connects roads 1 to 4.

A traffic network is a network structure including a plurality of roads. In a schematic diagram of a traffic network shown in FIG. 1, the traffic network is a network structure including roads 1 to 16, and arrows in FIG. 1 represent traffic directions of the roads in the traffic network.

A node is an endpoint of a link or a point representing a connection relationship between links.

A link (link) is a curved object representing a path between nodes and is used to represent a road or a lane, and includes nodes at two ends of the link and some shape points on the link. The link may store data and may include geometric data and topology data. The geometric data on the link is coordinates of the shape points on the link and represents a location and a shape of the link in a coordinate system. The topology data on the link is coordinates of two endpoints of the link and represents start and end locations of the link in the coordinate system and a topology relationship between the two endpoints.

A shape point may represent a shape of a road or a lane, and a plurality of shape points are connected to form a broken line representing a curve.

Figure 2:
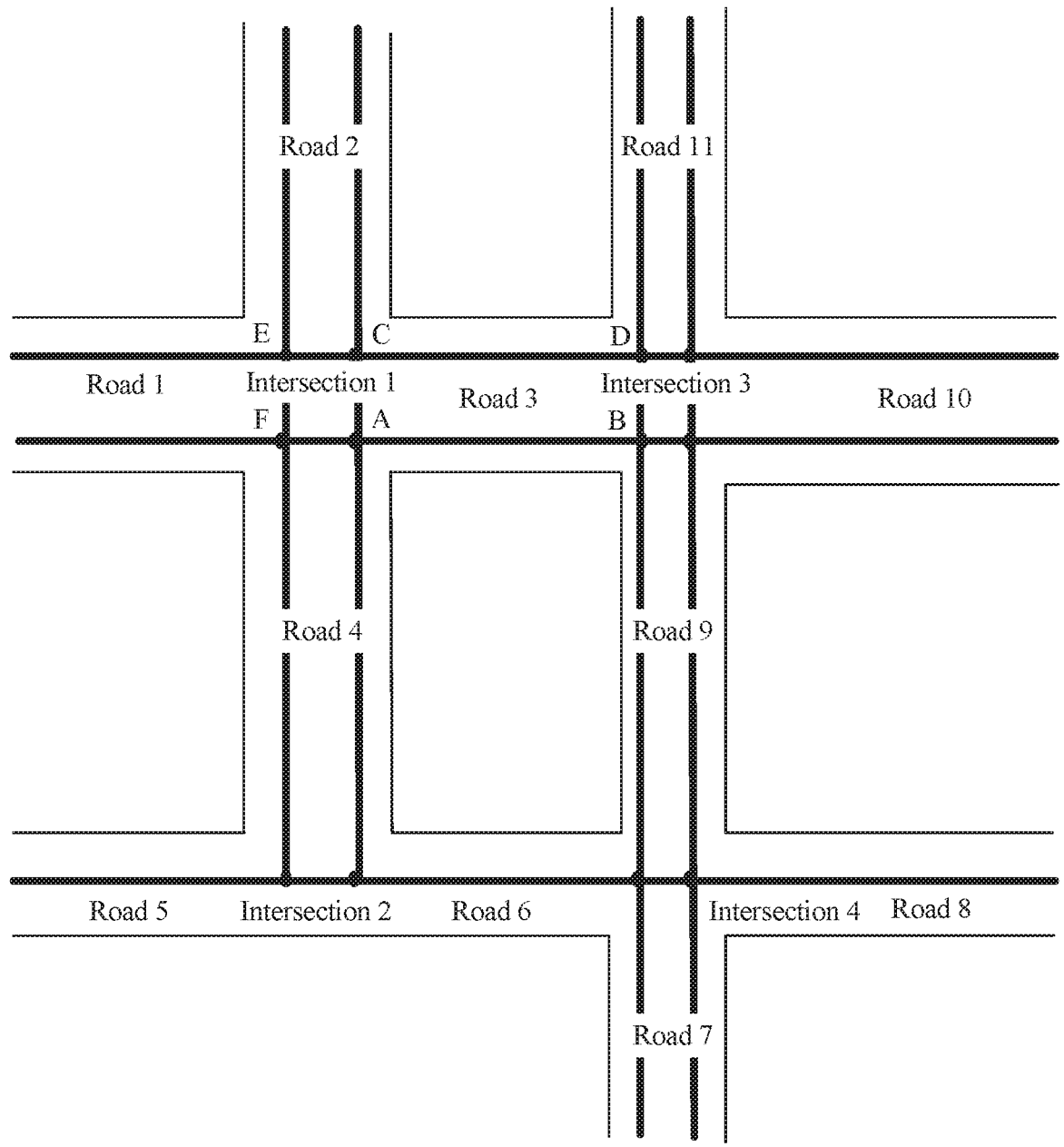
FIG. 2 is a schematic diagram of a road-level road network abstracted from a traffic network according to an embodiment of the present invention.

A road link is a segment of a straight line abstracted from a real road or a segment of a broken line that may represent a curve and that is abstracted from a real road. A road may have at least one road link. A road with a single traffic direction may be abstracted as one road link. For a road with two traffic directions, there is a traffic direction divider (a seat stone, a fence, a greenbelt, or the like, or a double-line sign drawn on the ground) between forward and reverse directions of the road, and a vehicle can run only in a prescribed single traffic direction on one side. The road with two traffic directions may be abstracted as two road links in map data, and therefore each road link may reflect a traffic direction of a vehicle on the road. As shown in FIG. 2, a line AB and a line CD are two road links of a road 3.

A lane link is a segment of a straight line that is abstracted from a segment of a real lane connecting two intersections or a segment of a broken line that represents a curve and that is abstracted from a segment of a real lane connecting two intersections. A lane may correspond to a lane link. Each lane link may reflect a traffic direction of a vehicle on the lane.

An entry link is a link entering an intersection for the intersection. For example, as shown in FIG. 2, a road link AB is an entry link for an intersection 3.

An exit link is a link exiting an intersection for the intersection. For example, as shown in FIG. 2, a road link CD is an exit link for an intersection 3.

A road network is a network structure that includes a link and a node and that is abstracted from a real traffic network. The road network may be divided into a road segment area and an intersection area.

A road-level road network is a network structure that includes a road link, an intra-intersection link, and an intersection node and that is abstracted from a real traffic network. FIG. 2 is a schematic diagram of a road-level road network abstracted from the traffic network shown in FIG. 1.

A lane-level network is a network structure that includes a lane link and a virtual lane connection line and that is abstracted from a real traffic network.

An intra-intersection link is a link between intersection nodes. As shown in FIG. 2, points A, C, E, and F are intersection nodes in an intersection 1, and lines AC, CE, EF, and FA are intra-intersection links.

Figure 22:
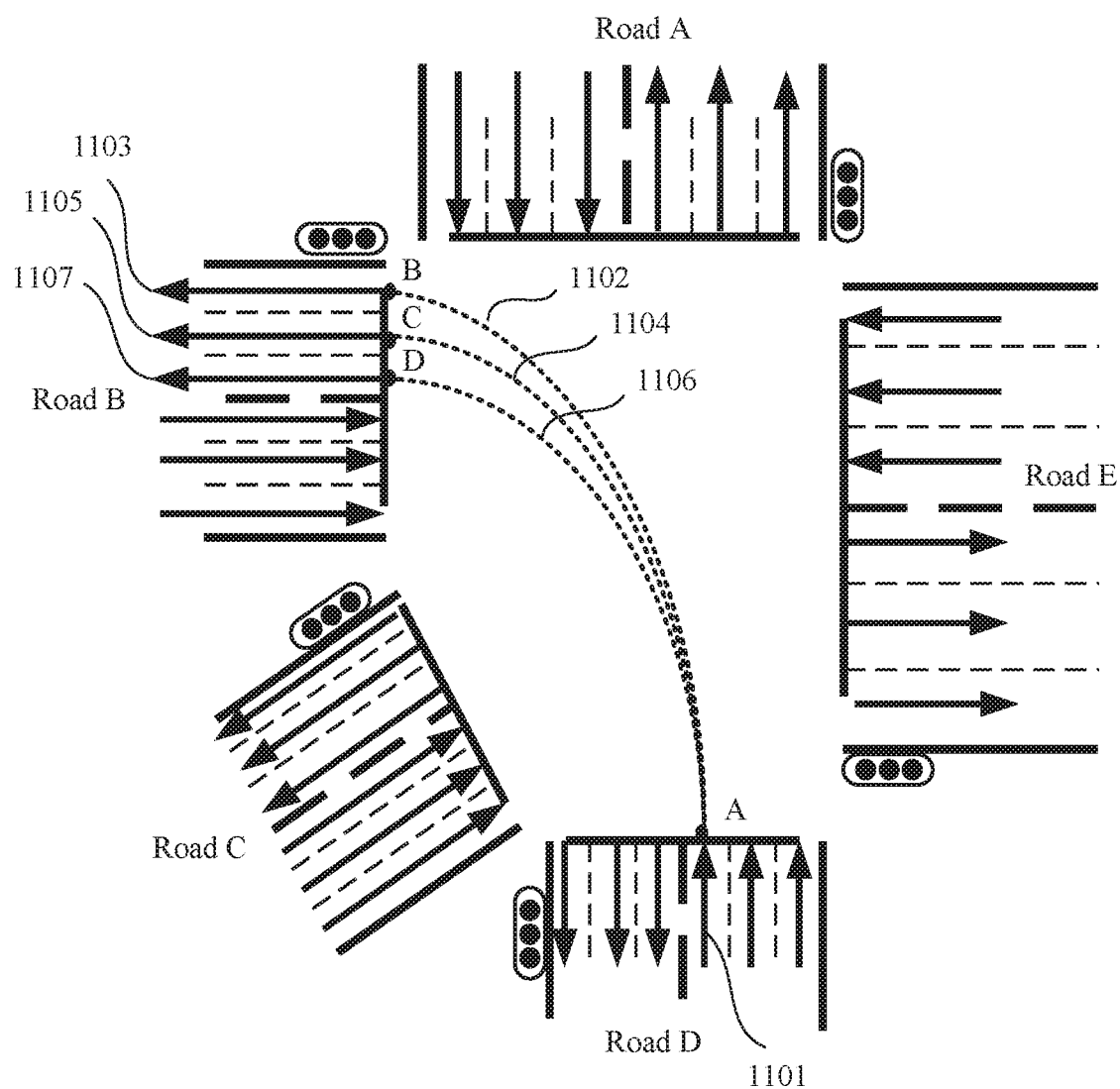
FIG. 22 is a schematic diagram of some virtual lane connection lines in a five-way intersection area according to an embodiment of the present invention.

A virtual lane connection line is a line connecting two lane links in an intersection, for example, dashed lines 1102, 1104, and 1106 in FIG. 22.

Coordinates are coordinates of a point or a line in a map coordinate system. Coordinate values include a longitude value and a latitude value.

A map coordinate system is a rectangular plane coordinate system converted from a non-plane geographic coordinate system through projection. In the map coordinate system, an origin (0,0) is defined at an intersection point of the equator and the prime meridian. In a projected coordinate system, an X-axis represents a latitude value, and a Y-axis represents a longitude value. For example, a common geographic coordinate system includes a WGS-84 coordinate system. A geographic coordinate system is a spherical coordinate system in which longitude and latitude are used to represent a location of a point on the ground, and a center of the earth is used as an origin of the spherical coordinate system. A location of any point on the earth may be determined by, using the geographic coordinate system. The earth is first abstracted as a regular spheroid, which is referred to as a reference spheroid, that approximates an original natural earth surface, and then a series of longitude and latitude are defined on the reference spheroid to form a longitude and latitude grid, so that a point location on the earth surface is described by the longitude and the latitude. It should be noted that a longitude and latitude geographic coordinate system is not a plane coordinate system. A degree is not a standard length unit, and therefore cannot be used to directly measure an area and a length.

FIG. 1 is a schematic plan view of a traffic network in a real world, and all intersections in the traffic network are crossroads or T-junctions with a regular shape. A road may have a single traffic direction or two traffic directions. There are roads 1 to 11 in an area shown in FIG. 1. Roads 5, 6 and 8 each have only one traffic direction, and all the other roads each have two traffic directions. FIG. 2 shows a schematic diagram of a road-level road network abstracted from the traffic network shown in FIG. 1. Lines AC, CE, EF, and FA in FIG. 2 are intra-intersection links, a line AR and a line CD are road links of a road 3, and points A, C, E, and F are intersection nodes in an intersection 1.

Figure 3:
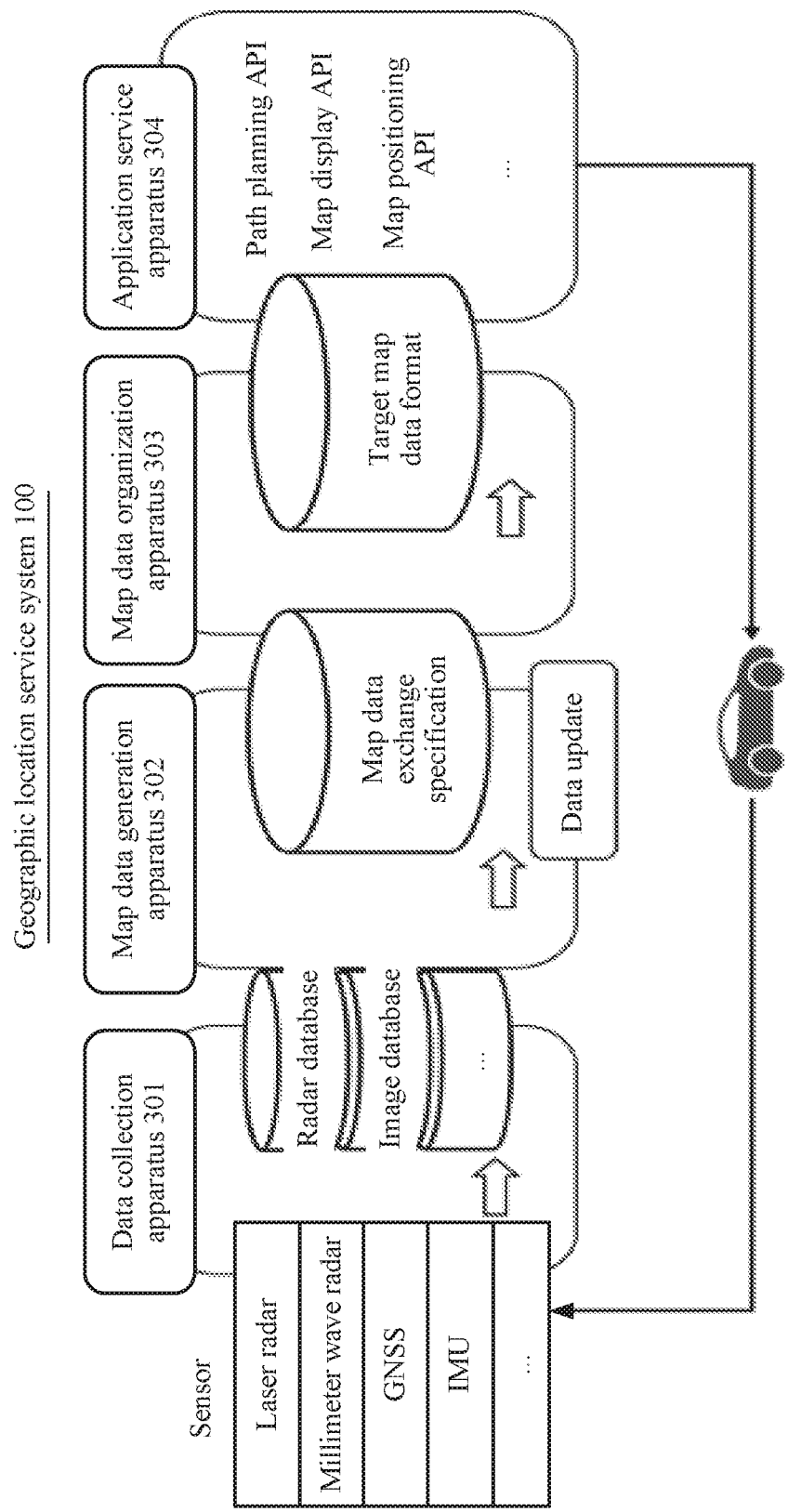
FIG. 3 is a framework of a geographic location service system according to an embodiment of the present invention.

An apparatus for generating road network data of an intersection area provided in the embodiments of the present invention is a part of an electronic map data generation apparatus 302 in a geographic location service system 100. FIG. 3 is a framework of the geographic location service system, and the geographic location service system may include a data collection apparatus 301, a map data generation apparatus 302, a map data organization apparatus 303, and an application service apparatus 304.

A sensor in the data collection apparatus 301 may collect, by performing environment perception on a real surface feature, longitude and latitude coordinate data, in a map coordinate system, of a surface feature in a real road, such as a lane dividing line, a road dividing line, a stop line, a pavement sign (such as a turning sign on a pavement), a suspending sign (such as speed limiting and forbidden information), an isolation strip, a guard rail, and a traffic light. The sensor may include one or more devices in a laser radar, a millimeter-wave radar, a camera, a Global Navigation Satellite System (GNSS), and Inertial Measurement Unit (IMU). Data collected by the sensor may be stored in different databases based on a type of the sensor, such as a radar database and an image database. The sensor may be configured on a removable terminal device, such as a motor vehicle, a mobile phone, or an unmanned aerial vehicle. The data collection apparatus 301 calibrates and aligns the data collected by the sensor to merge data collected by different sensors, thereby generating calibrated and aligned sensor data. The data collection apparatus 301 sends the generated sensor data or updated sensor data to the electronic map generation apparatus 302 through an interface.

The map data generation apparatus 302 generates map data based on the calibrated and aligned sensor data received from the data collection apparatus 301, and sends the map data to the map data organization apparatus 303 based on a map data exchange specification. The map data generation apparatus 302 may also generate updated map data based on the updated sensor data sent by the data collection apparatus 301.

The map data organization apparatus 303 may be configured to organize and process the map data sent by the map data generation apparatus 302, for example, make the data gridded, layered, and compact, and convert the data into binary data. The map data organization apparatus 303 sends the processed map data to the application service apparatus 304 based on a target map data format.

The application service apparatus 304 may be configured to provide an application programming interface, such as application programming interfaces (application programming interface, API) of path planning (road-level and lane-level path planning), a map presentation service, a map positioning service, and a map service.

Figure 4:
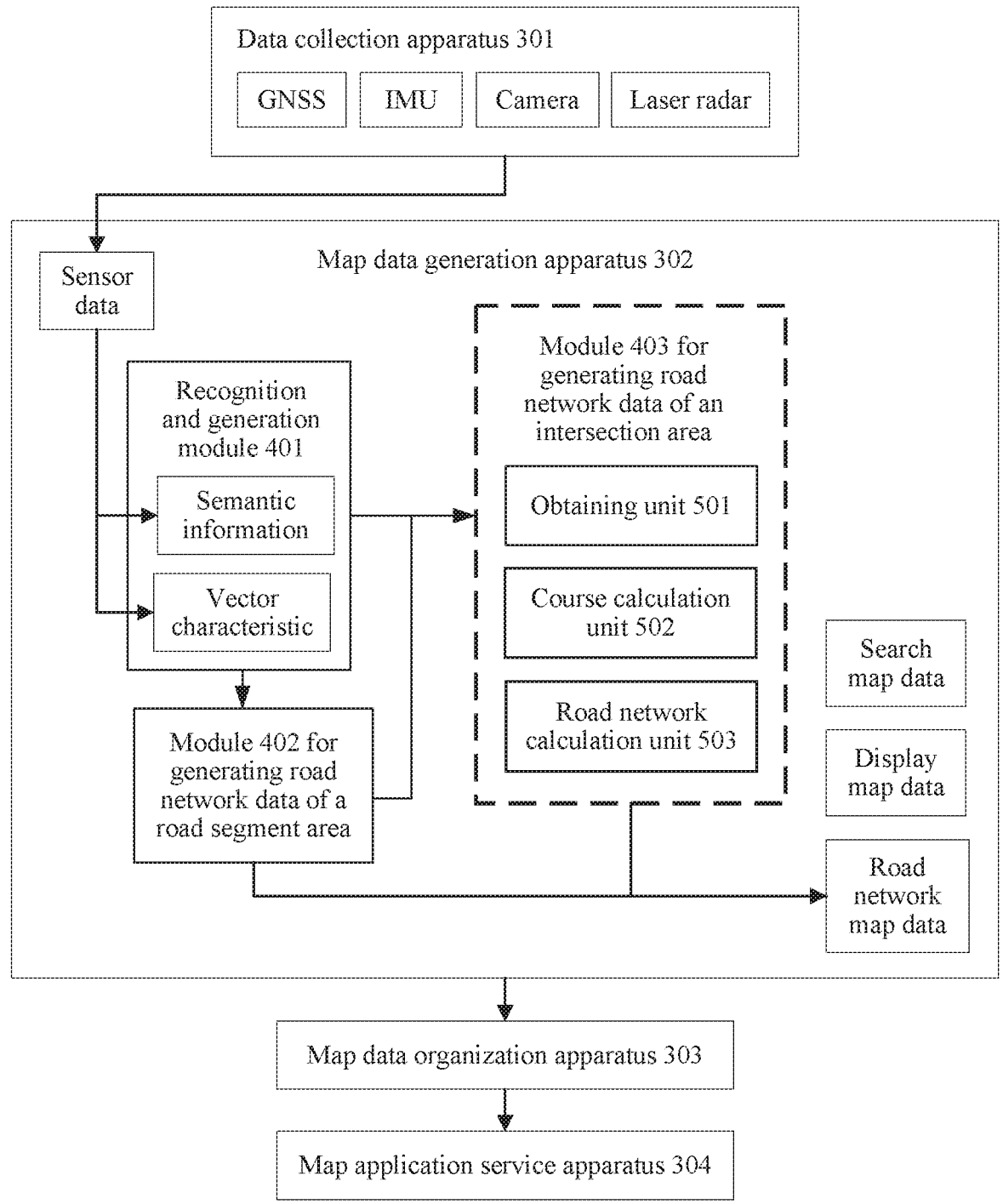
FIG. 4 is a schematic diagram of a map data generation apparatus according to an embodiment of the present invention.

The map data generation apparatus 302 is described below in detail, and FIG. 4 is a schematic diagram of the map data generation apparatus 302.

The map data generation apparatus 302 may include a recognition and generation module 401, a module 402 for generating road network data of a road segment area, and a module 403 for generating road network data of an intersection area.

The recognition and generation module 401 is configured to recognize semantic information and a vector characteristic of a surface feature in the sensor data based on the calibrated and aligned sensor data sent by the data collection apparatus 301, and generate surface feature geometric data. The surface feature geometric data includes a location, a shape, and a size of the surface feature in the map coordinate system, and may include coordinates of a series of point. Coordinate values may be a longitude value and a latitude value of the surface feature.

The semantic information of the surface feature is an attribute of the surface feature, that is, what is the surface feature. The vector characteristic of the surface feature represents the location, the shape, and the size of the surface feature. A road 3 in FIG. 1 is used as an example, and FIG. 5 is a schematic diagram of the road 3. The road 3 has two traffic directions and includes a main road and a service road. The main road has three lanes and the service road has only one lane. Surface features on the road 3 include a traffic light 501, a stop line 502, a traffic direction divider 503, a lane dividing line 504, a pavement sign 505, a road edge line 506, a main and service road dividing line 507, and a lane dividing line 508.

The stop line 502 is used as an example, and the recognition and generation module 401 may recognize that semantic information of the stop line 502 is a stop line, and a vector characteristic of the stop line 502 is a five-meter line, and calculate surface feature geometric data of the stop line 502, including coordinates of the stop line 502 in the map coordinate system.

When recognizing that semantic information of a surface feature is a surface feature in an intersection area, the recognition and generation module 401 sends a request for generating road network data of an intersection area to the module 403 for generating road network data of an intersection area. The surface feature in the intersection area may be a surface feature that may represent the intersection area, such as a stop line, a traffic light, or a pedestrian crossing.

The module 402 for generating road network data of a road segment area calculates data of a road link and data of a lane link based on the surface feature geometric data provided by, the recognition and generation module 401.

The data of the road link may include coordinates of some shape points on the road link, namely, geometric data of the road link, that represent a location and a shape of the road link; coordinates of two endpoints of the road link, namely, topology data of the road link, that represent start and end locations of the road link and a topology relationship between the two endpoints of the road link; and an ID of the road link.

Figure 6:
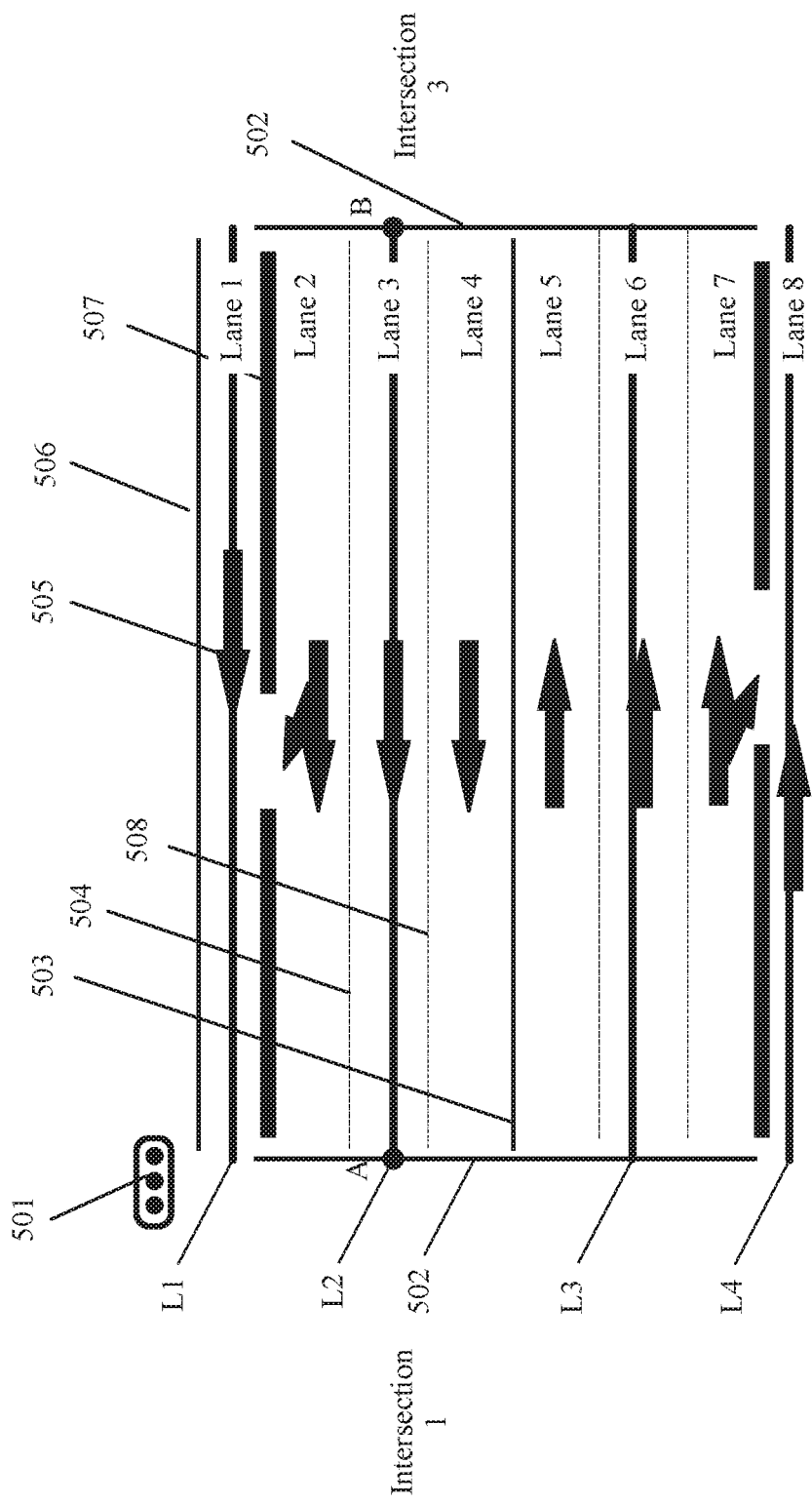
FIG. 6 is a schematic diagram of road links of a road 3 according to an embodiment of the present invention.

The road link may be generated through calculation by using surface feature geometric data of a surface feature such as a road edge line, a traffic direction divider, and a main and service road dividing line. As shown in FIG. 6, L1 to L4 are road links of the road 3. L1 and L4 are road links of the service road, and L2 and L3 are road links of the main road. The road link L1 of the service road may be generated through calculation based on surface feature geometric data of the road edge line 506 and the main and service road dividing line 507, and the road link L2 of the main road may be generated through calculation based on geometric data of the traffic direction divider 503 and the main and service road dividing line 507. For a road in which a main road and a service road are not distinguished, a road link of the road may be generated through calculation based on surface feature geometric data of a road edge line and a traffic direction divider.

The data of the lane link may include coordinates of some shape points on the lane link, namely, geometric data of the lane link, that represent a location and a shape of the lane link; coordinates of two endpoints of the lane link, namely, topology data of the lane link, that represent start and end locations of the lane link and a topology relationship between the two endpoints of the lane link; and an ID of the lane link.

Figure 7:
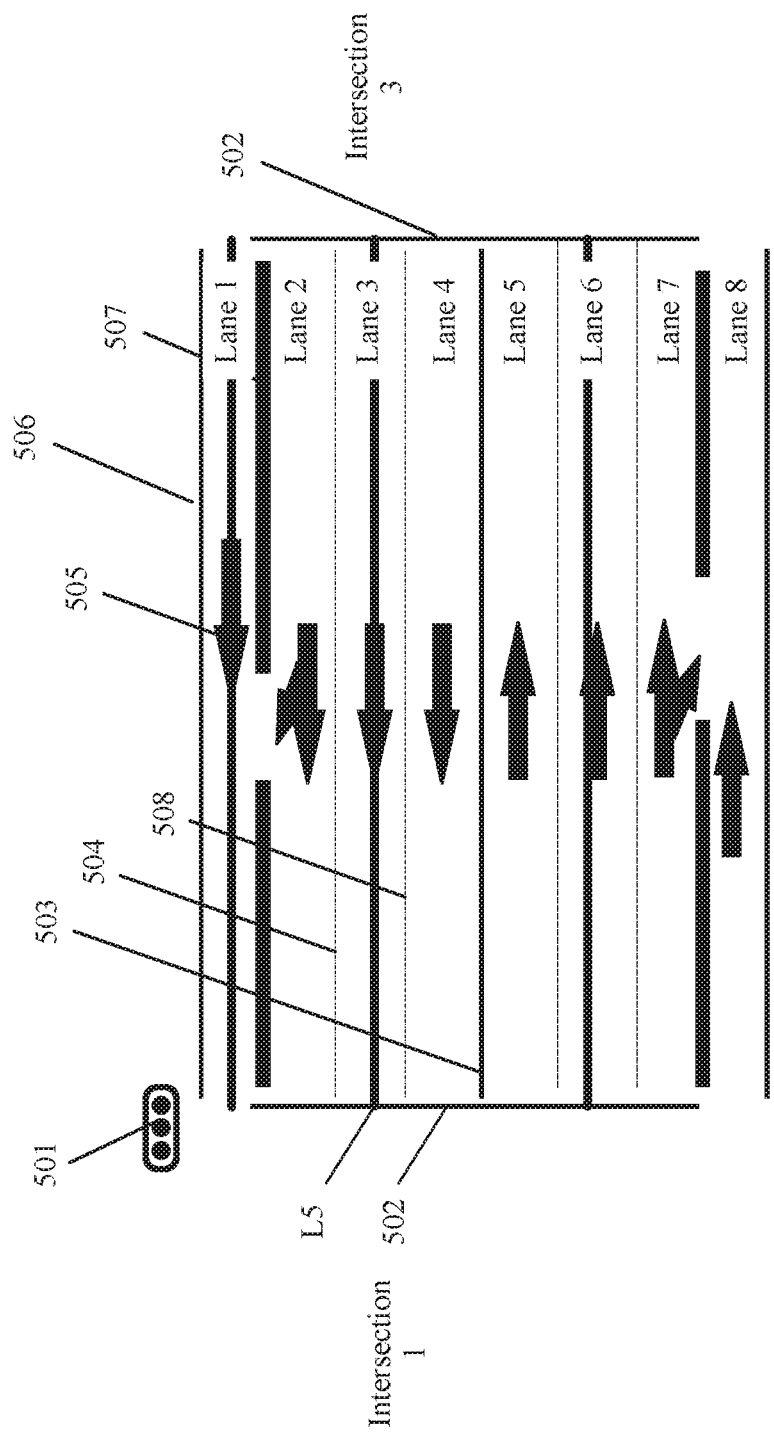
FIG. 7 is a schematic diagram of lane links of a road 3 according to an embodiment of the present invention.

The lane link may be generated through calculation by using geometric data of surface features forming a lane area. As shown in FIG. 7, L5 is a lane link of a lane 3 in the road 3. The lane link L5 may be generated through calculation based on geometric data of the lane dividing line 508 and the lane dividing line 504.

The data of the lane link may further include a field recording a lane attribute. A turning attribute includes a left-turn lane, a straight lane, a right-turn lane, or a combined lane.

There are a plurality of methods for calculating the lane link and the road link, for example, the following line merging method is one of the calculation methods.

In an example of calculating the lane link L5 in FIG. 7, the lane link L5 is generated through calculation based on the surface feature geometric data of the lane dividing lines 504 and 508. Assuming that the lane dividing lines 504 and 508 are straight lines, the surface feature geometric data of the lane dividing lines 504 and 508 is coordinates of endpoints of the lane dividing lines 504 and 508. It is assumed that the coordinates of the startpoint of the lane dividing line 504 are $S_1$ ($X_{s1}$, $Y_{s2}$), the coordinates of the endpoint of the lane dividing line 504 are $E_1$ ($X_{E1}$, $Y_{E2}$); and the coordinates of the startpoint of the lane dividing line 508 are $S_2$ ($X_{s2}$, $Y_{s2}$), and the coordinates of the endpoint of the lane dividing line 508 are $E_2$ ($X_{E2}$, $Y_{E2}$). It is assumed that a merged line segment SE is a lane link L5, and calculated coordinates of a point S and a point E are coordinates of two endpoints of the lane link L5, that is, data of the lane link L5:

$$\text{Startpoint } S\left(\frac{X_{S1} + X_{S2}}{2}, \frac{Y_{S2} + Y_{S2}}{2}\right)$$

$$\text{Endpoint } E\left(\frac{X_{E1} + X_{E2}}{2}, \frac{Y_{E1} + Y_{E2}}{2}\right)$$

The data of the road link and the data of the lane link may further respectively record traffic directions of the road link and the lane link.

A link may include some shape points, such as P1, P2, P3, P4, ..., and Pn. A sequence defined by P1→Pn is a sequence for recording data of coordinates of the shape points, that is, a line drawing direction. A rule on which a sequence for recording point coordinates is based is referred to as a line drawing rule, and the line drawing rule may be defined as drawing from left to right and from bottom to top.

A traffic direction, of a link, recorded in link data is defined by the line drawing direction. If the traffic direction in the link data is recorded as a forward direction, it means that a traffic direction of a vehicle reflected by a link is consistent with the line drawing direction, in other words, the traffic direction is from a first point to a last point in the line drawing direction. Alternatively, if the traffic direction in the link data is recorded as a reverse direction, it means that a traffic direction of a vehicle reflected by a link is opposite to the line drawing direction, in other words, the traffic direction is from a last point to a first point in the line drawing direction.

In an example of a road link L2 shown in FIG. 6, according to the line drawing rule of drawing from left to right and from bottom to top, a line drawing direction of the road link L2 is from a point A to a point B and may be considered as a direction from left to right in FIG. 6. However, a traffic direction of the road link L2 in FIG. 6 may be considered as a direction from right to left and is opposite to the line drawing direction of the road link L2. Therefore, a traffic direction in data of the road link L2 is recorded as a reverse direction. The data of the road link L2 may be: coordinates of the point A, coordinates of the point B, and the traffic direction, namely, the reverse direction.

The module 402 for generating road network data of a road segment area may be further configured to establish a relationship between a lane and a road, and specifically, establish a relationship between a lane link and a road link in a road, for example, record an association that the lane link L5 and the road links L1 to L4 belong to the road 3. The module 402 for generating road network data of a road segment area may be further configured to establish an association between a road link and a surface feature in an intersection area.

So far, data of each road link may include coordinates of endpoints and shape points on the road link that are recorded in sequence in a line drawing direction, a traffic direction of the road link (a forward direction and/or a reverse direction), and an ID of the road link.

Similarly, it can be learned that data of each lane link may include coordinates of two endpoints and shape points on the lane link that are recorded in sequence in a line drawing direction, a traffic direction of the lane link (a forward direction and/or a reverse direction), and an ID of the lane link.

For an intersection, the road link and the lane link each may be divided into an entry link and an exit link. For example, as shown in FIG. 7, the lane link L5 is an entry link for the intersection 1 and is an exit link for an intersection 3. When a line drawing direction of a link points to a direction entering an intersection, if a traffic direction of the link is a forward direction, the link is an entry link for the intersection; or if a traffic direction of the link is a reverse direction, the link is an exit link for the intersection.

For example, as shown in FIG. 6, the road link L2 is an entry link for the intersection 1 and is an exit link for the intersection 3. In reality, there is such a case: a road has only a road edge line, but no other surface features such as a pavement sign and a lane dividing line on a pavement. As a result, a computer cannot distinguish, based on data collected by a sensor, whether the road has a single traffic direction or two traffic directions. Therefore, a traffic direction of the road may be recorded as two traffic directions, and a road link corresponding to the road may be both an entry link and an exit link for a same intersection.

A road link and a lane link may be calculated based on surface features such as a lane dividing line and a road edge line during generation of road network data of a road segment area. However, an intersection area has no surface features such as a lane dividing line and a road edge line similar to those in a road segment area, and therefore a connection relationship between road links in the intersection area needs to be implemented by constructing an intra-intersection link and an intersection node. The intra-intersection link and the intersection node may be used to represent a connection between roads in the intersection area. Then a virtual lane connection line is calculated based on this to connect lane links, and a lane-level road network topology in the intersection area is established to represent a connection between lanes in the intersection area.

A road-level road network topology is constructed by using an entry link and an exit link of a road that are connected by an intra-intersection link and an intersection node, and corresponding data is data of a road-level road network. The data of the road-level road network may include road network data of a road segment area and road network data of an intersection area, and the road network data of the intersection area may include data of the intra-intersection link and the intersection node.

A lane-level road network topology is constructed by connecting a virtual lane connection line to an entry link and an exit link of a lane, and data of a lane-level road network of an intersection area includes data of the virtual lane connection line.

Figure 8:
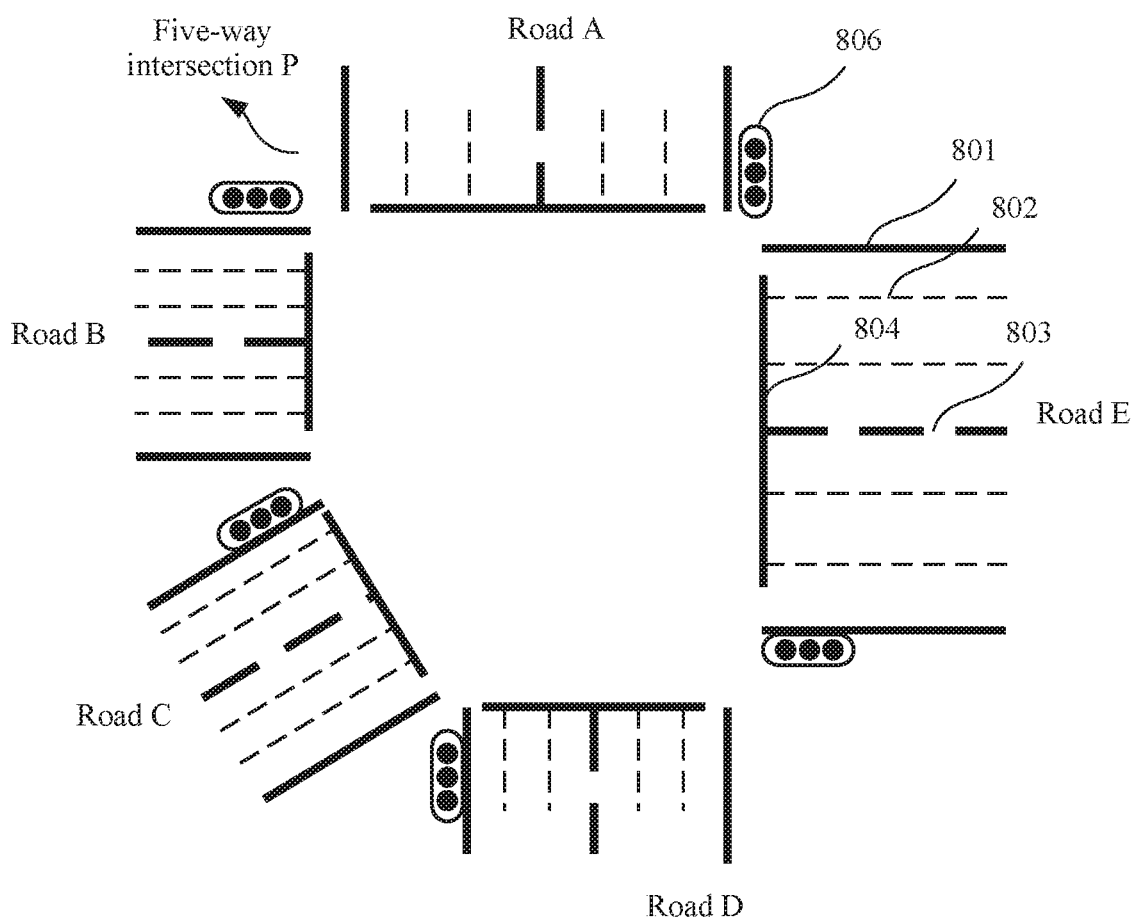
FIG. 8 is a schematic diagram of a five-way intersection according to an embodiment of the present invention.
Figure 9:
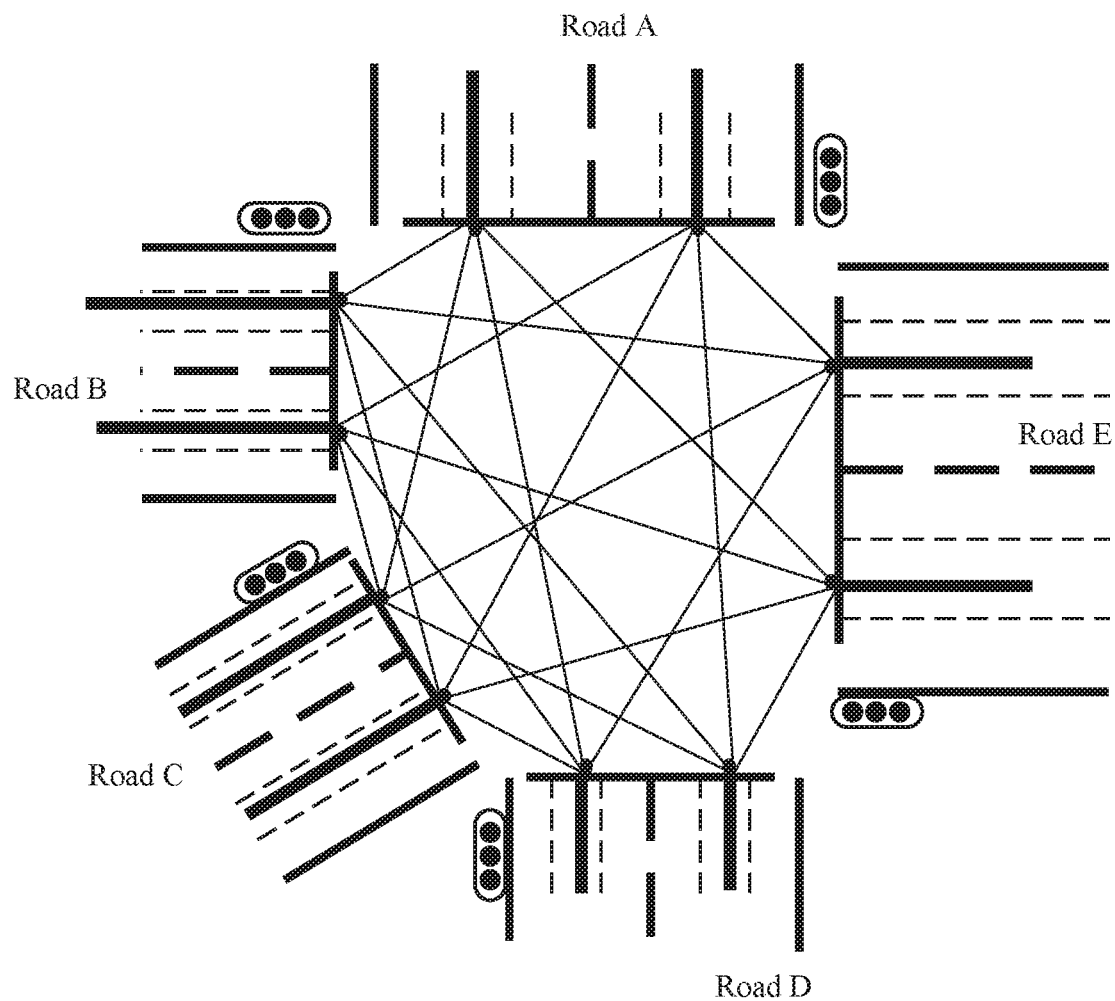
FIG. 9 is a road-level road network of a five-way intersection area established by using a traversing method according to an embodiment of the present invention.
Figure 10:
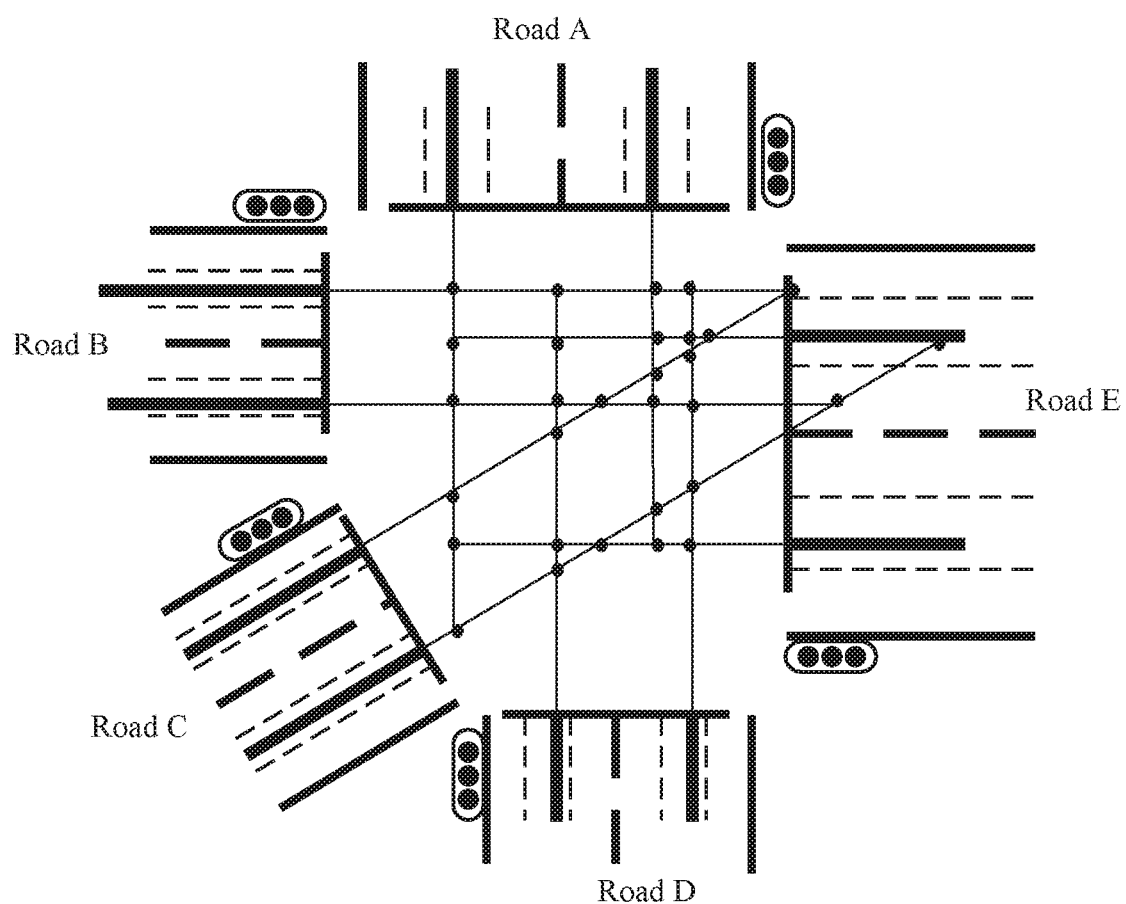
FIG. 10 is a road-level road network of a five-way intersection area established by using an extended intersection method according to an embodiment of the present invention.

For a regular and symmetrical crossroad, a road-level road network topology of an intersection area may be constructed by directly extending a road link, to generate road-level road network data of the intersection area. However, for a complex multi-way intersection, an intra-intersection link and an intersection node are usually generated through calculation by using a traversing method or an extended intersection method. A five-way intersection P shown in FIG. 8 is used as an example. FIG. 9 is a schematic diagram of a road-level road network of an intersection area established by using a traversing method, an entry link of a road is connected to exit links of other roads, an intersection node in the intersection area is set at an endpoint location of a road link, and an intra-intersection link is between intersection nodes. FIG. 10 is a schematic diagram of a road-level road network of an intersection area established by using an extended intersection method, a road link is directly extended, intersection points of a road link of any road and all road links of other roads are intersection nodes, and an intra-intersection link is between intersection nodes.

For a path planning algorithm whose time complexity is O((m+n)log n) (m is a quantity of intra-intersection links, and n is a quantity of intersection nodes), an excessively large quantity n of intersection nodes and an excessively large quantity m of intra-intersection links are generated by using the traversing method and the extended intersection method. This not only increases a time for path planning, failing to meet time validity of path planning, but also causes an excessively large amount of road-level road network data of the intersection area. In addition, when there are an excessively large quantity of intra-intersection links in the intersection area, a positioning point cannot match an intra-intersection link through simple calculation during spatial positioning performed in the intersection area by using electronic map data, and calculation complexity needs to be increased to ensure positioning quality. Consequently, a delay of a positioning module is increased.

In addition, for an irregular intersection (such as a three-way intersection shown in FIG. 11), when a road-level road network topology of an intersection area is established by using the extended intersection method, there may be no intersection point of direct extension lines of road links, or intersection points of extension lines of road links are not in an intersection plane. Consequently, the road network topology of the intersection area fails to be constructed. For this phenomenon, a connection relationship between the road links in the intersection area is manually marked in an offline mode. Manual marking reduces road network data generation efficiency but cannot meet a requirement of high time validity for use.

Figure 12:
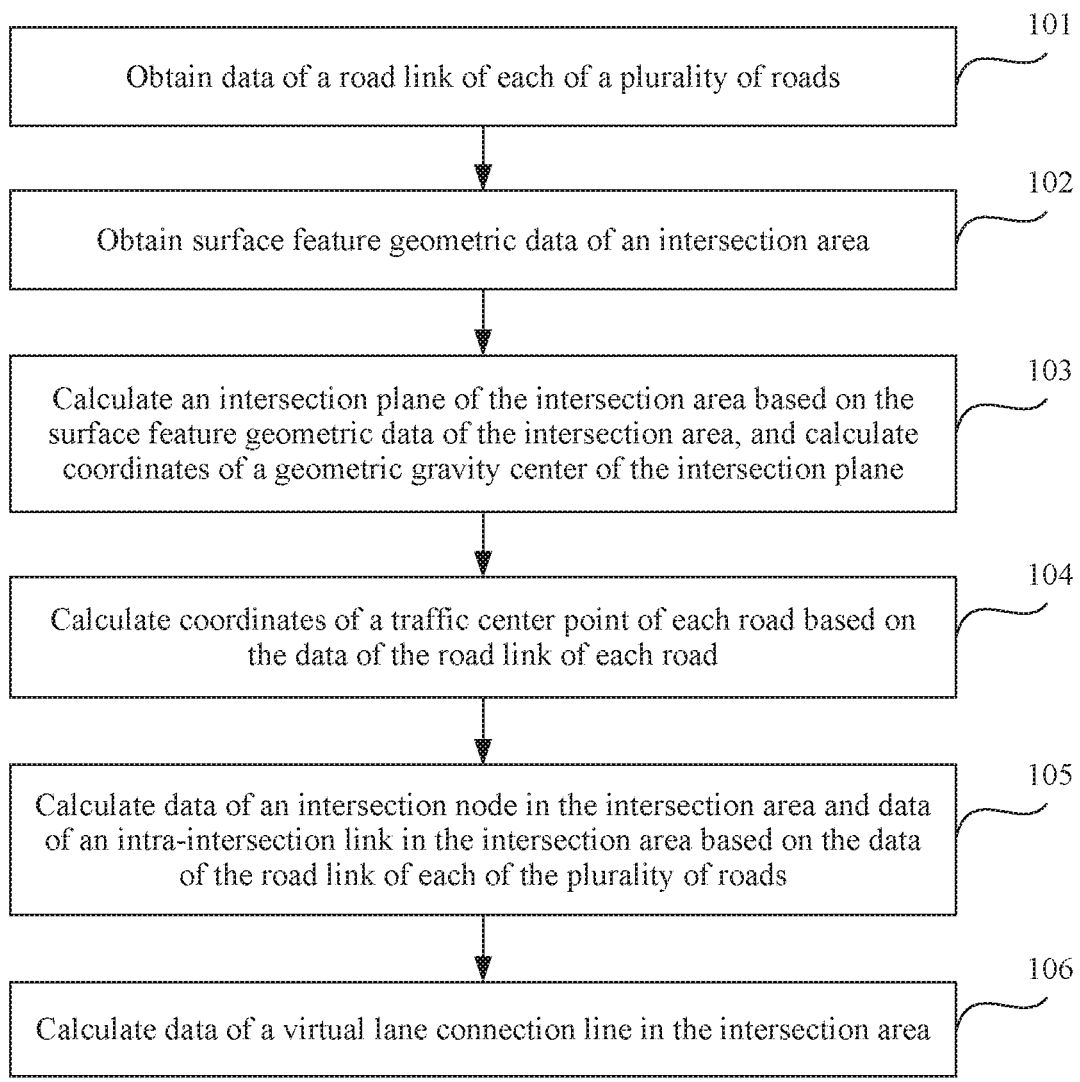
FIG. 12 is a schematic flowchart of a method for generating road network data of an intersection area according to an embodiment of the present invention.

According to the method for generating road network data of an intersection area provided in the embodiment of the present invention, a simple road-level road network may be constructed, relatively small quantities of intersection nodes and intra-intersection links are generated, and time validity of path planning is met. The method is applicable to a multi-way intersection and an irregular intersection. The apparatus for generating road network data of an intersection area provided in the embodiments of the present invention may be the module 403 for generating road network data of an intersection area in the map data generation apparatus 302. The five-way intersection P shown in FIG. 8 is used as an example to describe a method for generating road network data of an intersection area of the five-way intersection P. A method flowchart is shown in FIG. 12, and the method specifically includes the following steps.

The five-way intersection P connects roads A, B, C, D, and E. Each road has two traffic directions and includes six lanes.

Step 101: Obtain data of a road link of each of the plurality of roads.

When recognizing a semantic characteristic of an intersection surface feature, for example, when recognizing that a semantic characteristic of a surface feature 806 in FIG. 8 is a traffic light and a semantic characteristic of a surface feature 804 is a stop line, the recognition and generation module 401 sends a request for generating road network data of an intersection area to an obtaining unit 501.

Figure 13:
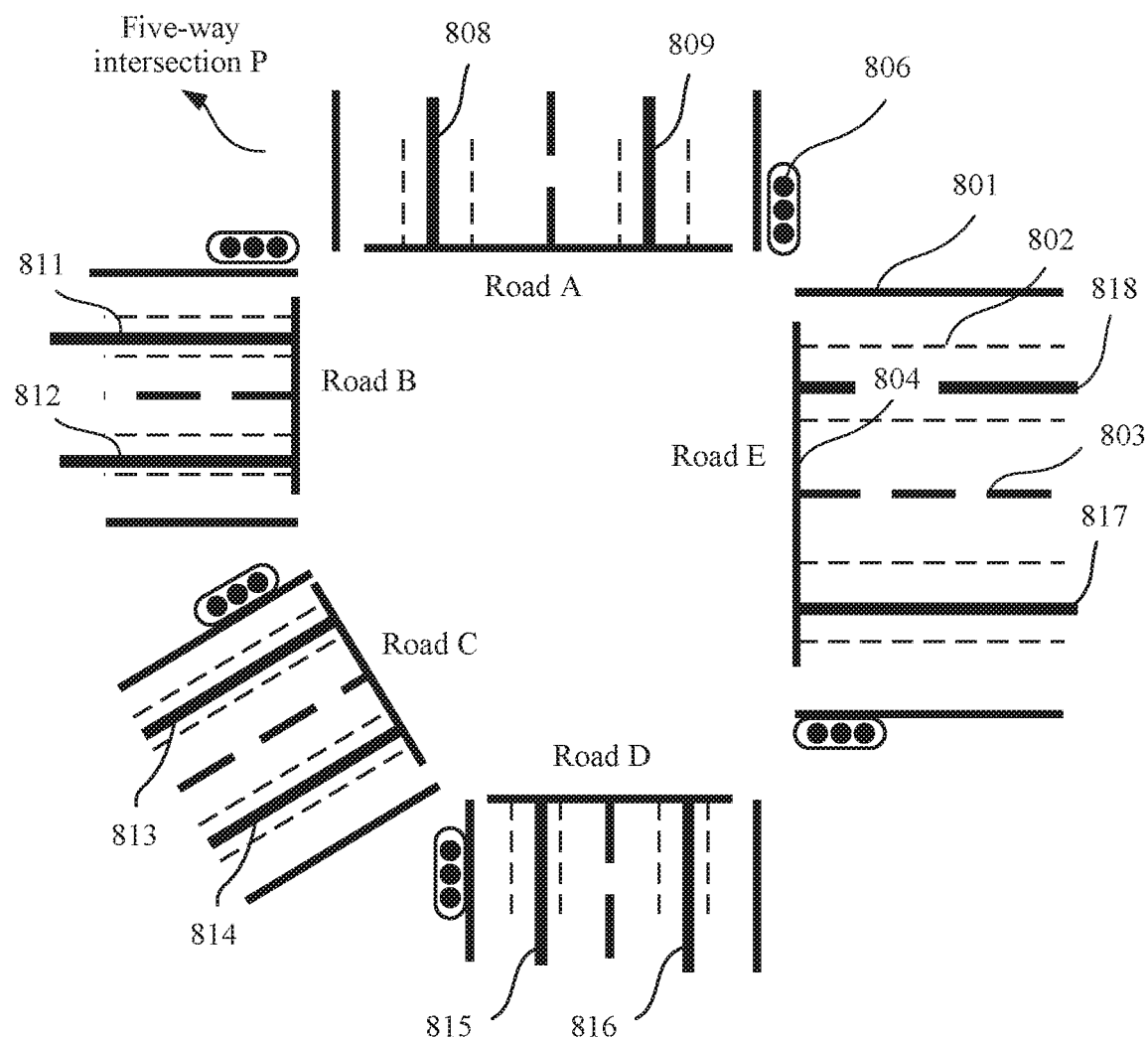
FIG. 13 is a schematic diagram of road links in an intersection area of a five-way intersection according to an embodiment of the present invention.

After receiving the request that is for generating road network data of an intersection area and that is sent by the recognition and generation module 401, the obtaining unit 501 obtains data of a road link in the intersection area from the module 402 for generating road network data of a road segment area. If a main road and a service road are not distinguished in the roads A, B, C, D, and E connected by the five-way intersection P, FIG. 13 shows a schematic diagram of a road link in the intersection area of the five-way intersection P. Because each road has two traffic directions, each road corresponds to two road links.

Considering different traffic rules in different countries, a vehicle drives on a left side of a road in a country using a left-hand traffic rule, and a vehicle drives on a right side of a road in a country using a right-hand traffic rule.

For the right-hand traffic rule, a road link 808 of the road A in FIG. 13 is an entry link for the five-way intersection P and a road link 809 of the road A is an exit link for the five-way intersection P. Similarly, it can be learned that road links 812, 814, 816, and 818 are entry links for the five-way intersection P and road links 811, 813, 815, and 817 are exit links for the five-way intersection P. The road link 808 is used as an example, and road link data of the road link 808 includes:

coordinates of endpoints and shape points on the road link 808 that are recorded in a line drawing direction;

an ID of the road link 808; and a traffic direction of the road link 808: a reverse direction. For the right-hand traffic rule, the road link 808 is an entry link for the five-way intersection P, and the traffic direction is from top to bottom in FIG. 13. However, the line drawing direction of the road link 808 is from bottom to top according to a line drawing rule, and the traffic direction of the road link 808 is opposite to the line drawing direction. Therefore, the traffic direction of the road link 808 is recorded as the reverse direction.

For the left-hand traffic rule, a road link 808 of the road A in FIG. 13 is an exit link for the five-way intersection P and a road link 809 of the road A is an entry link for the five-way intersection P. Similarly, it can be learned that road links 812, 814, 816, and 818 are exit links for the five-way intersection P, and road links 811, 813, 815, and 817 are entry links for the five-way intersection P. The road link 808 is used as an example, and road link data of the road link 808 includes:

coordinates of endpoints and shape points on the road link 808 that are recorded in a line drawing direction;

an ID of the road link 808; and a traffic direction of the road link 808: a forward direction. For the left-hand traffic rule, the road link 808 is an exit link for the five-way intersection P, and the traffic direction is from bottom to top in FIG. 13. However, the line drawing direction of the road link 808 is from bottom to top according to a line drawing rule, and the traffic direction of the road link 808 is consistent with the line drawing direction. Therefore, the traffic direction of the road link 808 is recorded as the forward direction.

Step 102: Obtain surface feature geometric data of an intersection area.

After receiving the request that is for generating road network data of an intersection area and that is sent by the recognition and generation module 401, the obtaining unit 501 obtains the surface feature geometric data of the intersection area from the recognition and generation module 401. For the five-way intersection P shown in FIG. 8, surface feature geometric data of the intersection area of the five-way intersection P may be, for example, coordinates of a boundary or an endpoint of a traffic light 806, a road edge line 801, a traffic direction divider 803, and a stop line 804 in the intersection area in FIG. 13.

Step 103: Calculate an intersection plane of the intersection area based on the surface feature geometric data of the intersection area, and calculate coordinates of a geometric gravity center of the intersection plane.

Figure 14:
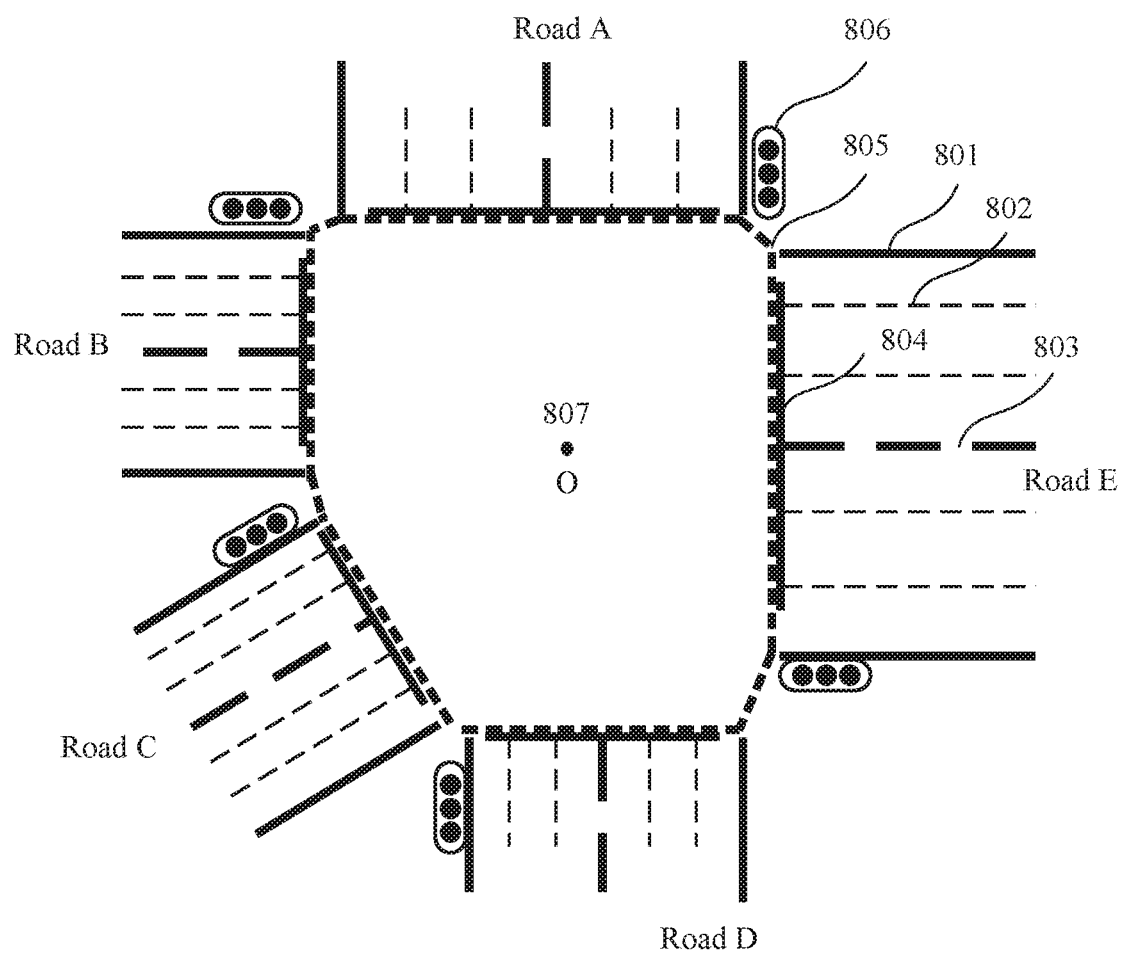
FIG. 14 is a schematic diagram of an intersection plane in an intersection area of a five-way intersection according to an embodiment of the present invention.

A course calculation unit 502 calculates a polygon based on the surface feature geometric data that is of the intersection area and that is obtained by the obtaining unit 501, and the polygon is the intersection plane. FIG. 14 shows a schematic diagram of an intersection plane of the intersection area of the five-way intersection P shown in FIG. 8, and the geometric gravity center is a point O. Surface features 801 to 804, and 806 shown in FIG. 14 are surface features in the intersection area of the five-way intersection P that are obtained in step 101. An intersection plane 805 of the intersection area is calculated based on the coordinates that are of the boundary or the endpoint of the traffic light 806, the road edge line 801, the traffic direction divider 803, and the stop line 804 in the intersection area and that are in the surface feature geometric data of the surface features. A geometric gravity center point 807 of the intersection plane 805 is calculated.

Calculating a geometric gravity center of an intersection plane means calculating a geometric gravity center of a polygon representing the intersection plane. Assuming that mass of the polygon is evenly distributed, a method for calculating the geometric gravity center of the polygon is specifically as follows:

The polygon is segmented into triangles 1, 2, 3, 4, . . . , and n through triangulation. Areas of the triangles 1, 2, 3, 4, . . . , n are respectively $\sigma_1$, $\sigma_2$, $\sigma_3$, $\sigma_4$, . . . , and $\sigma_n$, and coordinates of gravity centers respectively corresponding to the triangles are $G_1$ ($X_1$, $Y_1$), $G_2$ ($X_2$, $Y_2$), $G_3$ ($X_3$, $Y_3$), . . . , and $G_n$ ($X_n$, $Y_n$). A gravity center is an intersection point of three center lines of a triangle in geometry.

Coordinates of the geometric gravity center G of the polygon are:

$$G\left(\frac{\sum_{i=1}^{n} X_i \sigma_i}{\sum_{i=1}^{n} \sigma_i}, \frac{\sum_{i=1}^{n} Y_i \sigma_i}{\sum_{i=1}^{n} \sigma_i}\right)$$

When the calculated polygon of the intersection plane is a regular figure (such as a square and a regular triangle), a geometric center of the polygon is the geometric gravity center of the polygon.

Step 104: Calculate coordinates of a traffic center point of each road based on the data of the road link of each road.

Figure 15:
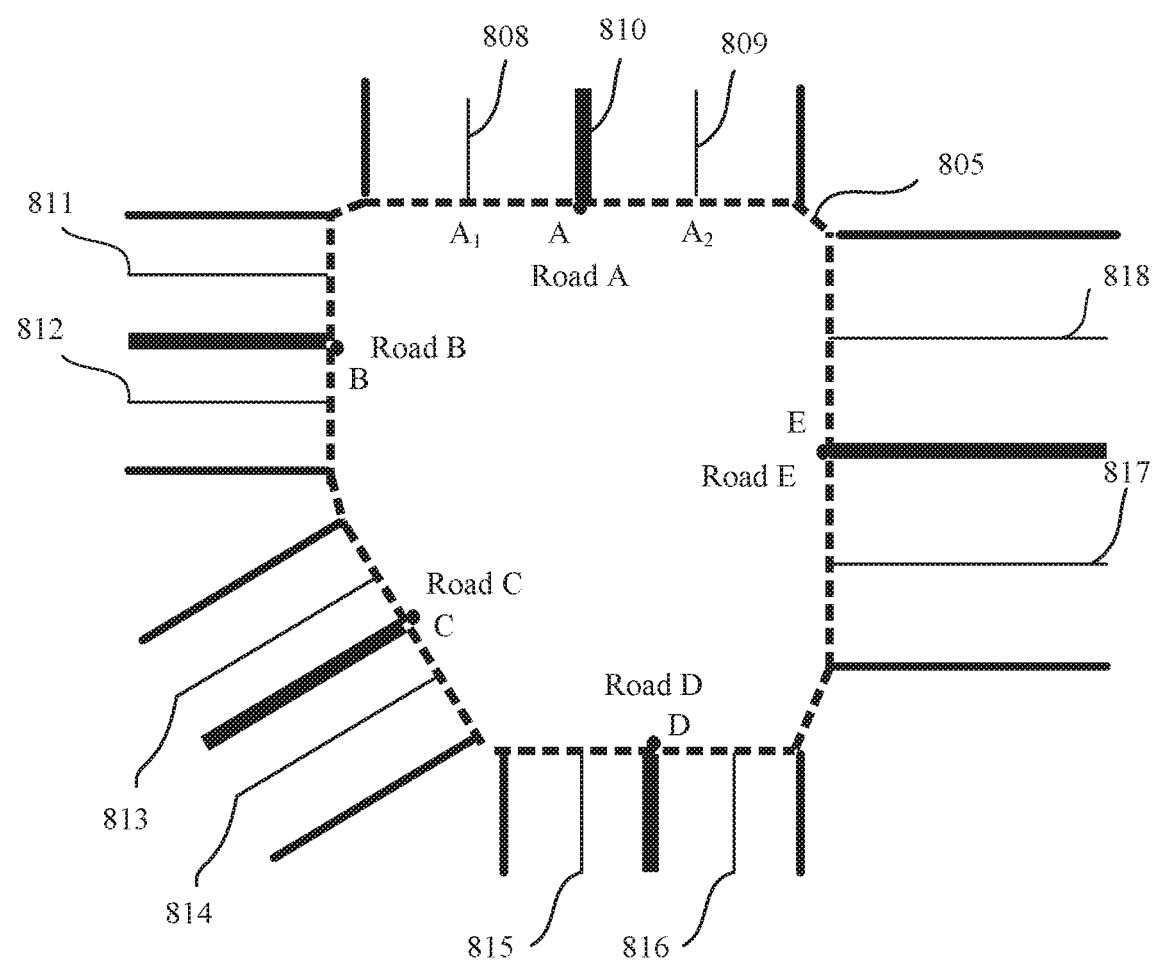
FIG. 15 is a schematic diagram of traffic center points of roads connected by a five-way intersection according to an embodiment of the present invention.

Two methods for calculating the traffic center point of the road based on the data of the road link of the road are provided as examples, but do not limit a method for calculating a traffic center point. FIG. 15 shows a schematic diagram of traffic center points of roads connected by the five-way intersection P shown in FIG. 8. Road links 808, 809, and 811 to 818 shown in FIG. 15 are the road links in the intersection area of the five-way intersection P that are obtained in step 101. Traffic center points of the roads A, B, C, D, and E obtained through calculation are respectively points A, B, C, D, and E.

Method 1: A traffic center point of a road is obtained by using an intersection point of a road link of a road and an intersection plane.

Road link data includes coordinates of some shape points on the road link, and it may be learned through calculation that coordinates of intersection points of road links 1, 2, 3, 4, . . . , and n of one road and the intersection plane are respectively $A_1$ ($X_1$, $Y_1$), $A_2$ ($X_2$, $Y_2$), $A_3$ ($X_3$, $Y_3$), $A_4$ ($X_4$, $Y_4$), . . . , and $A_n$ ($X_n$, $Y_n$). A center point A of the intersection points $A_1$, $A_2$, $A_3$, $A_4$, . . . , and $A_n$ ($X_n$, $Y_n$) is calculated. Coordinates of the traffic center point A of the road are:

$$A\left(\frac{1}{n}\sum X_n, \frac{1}{n}\sum Y_n\right)$$

In an example of calculating the traffic center point A of the road A in FIG. 15, coordinates of intersection points of the intersection plane 805 and the road link 808 and the road link 809 of the road A are respectively $A_1$ ($X_1$, $Y_1$) and $A_2$ ($X_2$, $Y_2$), and coordinates of the traffic center point A of the road A are:

$$A\left(\frac{X_1 + X_2}{2}, \frac{Y_1 + Y_2}{2}\right)$$

Similarly, coordinates of the traffic center points B, C, D, and E of the roads B, C, and E may be respectively calculated.

In another embodiment, a road may include a main road and a service road, and correspondingly have a road link of the main road and a road link of the service road. A method for calculating a traffic center point of this type road is: calculating intersection points of the intersection plane and all road links of the road according to the foregoing method, and then calculating a center point of the intersection points as the traffic center point of the road.

Method 2: A merging line of a road link of a road is calculated, and an intersection point of the merging line and an intersection plane is a traffic center point of the road.

Road link data includes coordinates of some shape points on the road link, and coordinates of a startpoint and an endpoint of a last broken line segment in which road links 1, 2, 3, 4, . . . , and n of the road intersect with the intersection plane are obtained. Coordinates of a startpoint and an endpoint of a merging line of n broken line segments are calculated by using the line merging method used to calculate the road link, and an intersection point of the merging line and the intersection plane is the traffic center point of the road.

In an example of calculating of the traffic center point A of the road A in FIG. 15, a merging line 810 of the road link 808 and the road link 809 of the road. A is first calculated, and a point A at which the calculated merging line 810 intersects with the intersection plane 805 is the traffic center point of the road A. Similarly, coordinates of the traffic center points B, C, D, and E of the roads B, C, D, and E may be respectively calculated.

In another embodiment, a road may be divided into a main road and a service road, and correspondingly have road links of the main road and road links of the service road. A method for calculating a traffic center point of this type of road is as follows: A merging line of the road links of the main road and a merging line of the road links of the service road in the road are first calculated according to a line merging method, then a merging line of the two merging lines is calculated, and an intersection point of the final merging line and the intersection plane is finally calculated and is used as the traffic center point of the road.

A ray from a traffic center point of a road to a traffic center point in the intersection plane is defined as a course of the road. Specifically, a course of each road may be a ray from the traffic center point of the road to the geometric gravity center point of the intersection plane. The course of each road may alternatively be a ray from the traffic center point of the road to a point near the geometric gravity center point of the intersection plane.

A direction angle of the course may be defined as an acute included angle formed by a ray of the course and an X-axis of a coordinate system.

Figure 16:
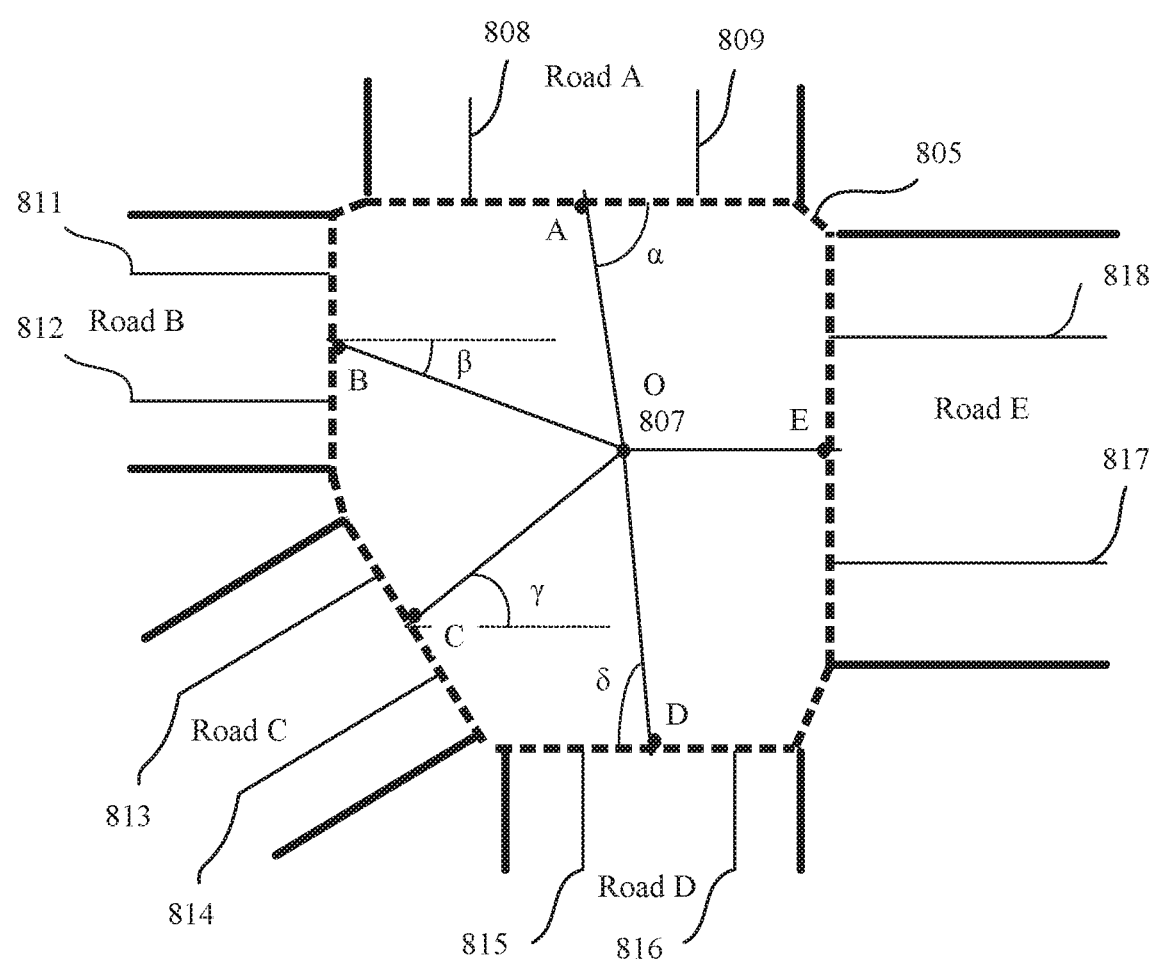
FIG. 16 is a schematic diagram of courses and direction angles of roads connected by a five-way intersection according to an embodiment of the present invention.

FIG. 16 shows courses and direction angles of roads connected by the five-way intersection P shown in FIG. 8. Road links 808, 809, and 811 to 818 shown in FIG. 16 are the road links in the intersection area of the five-way intersection P that are obtained in step 1. A course of the road A is AO, and courses of roads B, C, D, and E are respectively BO, CO, DO, and EO. A direction angle of the course AO is α, a direction angle of the course BO is β, a direction angle of the course CO is γ, and a direction angle of the course DO is δ.

In an example of a calculation process of the direction angle α of the course of the road A, if the coordinates of the traffic center point A of the road A are $(X_1, Y_1)$, and coordinates of the geometric gravity center 807 of the intersection plane are $O(X_2, Y_2)$, it may be learned that the direction angle of the course of the road A is $\alpha=\arctan((Y_2-Y_1)/(X_2-X_1))$. Similarly, the direction angles of the courses of the roads B, C, D, and E may be respectively calculated.

Step 105: Calculate data of an intersection node in the intersection area and data of an intra-intersection link in the intersection area based on the data of the road link of each of the plurality of roads, where the data of the intersection node includes coordinates of the intersection node, and the data of the intra-intersection link includes coordinates of endpoints of the intra-intersection link.

Specifically, a road network calculation unit 503 calculates coordinates of an intersection point of an extension line of an entry link of each road and an extension line of an exit link of a neighboring road. The coordinates of the intersection point are the coordinates of the intersection node. The neighboring road is a road counterclockwise adjacent to the road; and the right-hand traffic rule is followed in a country or region in which the intersection area is located; or the neighboring road is a road clockwise adjacent to the road, and the left-hand traffic rule is followed in a country or region in which the intersection area is located.

Two intersection nodes in sequence are the endpoints of the intra-intersection link. An intra-intersection link is formed between two intersection nodes, to form a road-level road network topology of the intersection area. A connection relationship between road links in the intersection area is established, and can reflect straight going and left and right turning between roads in the intersection area.

Specifically, the road network calculation unit 503 makes extension lines of the entry link and the exit link of each road in the intersection plane of the intersection area according to the course of the road. The course of each road is a direction from the traffic center point of the road to the geometric gravity center of the intersection plane.

An extension line of the road link of each road is made in the intersection plane according to the course of the road. The road link of each road is extended according to the course of the road. To be specific, each of direction angles of extension lines of the entry link and the exit link of each road is equal to a direction angle of the course of the road.

Figure 17:
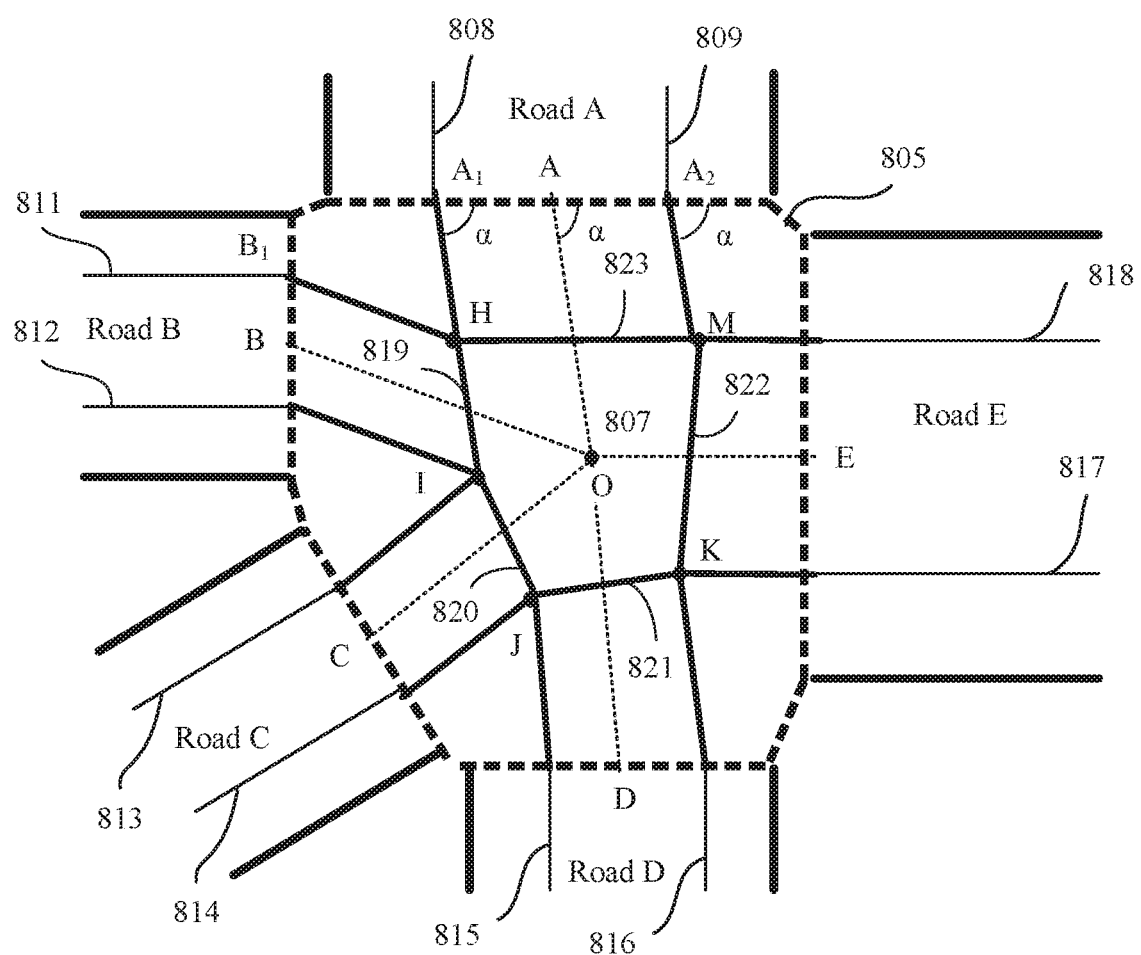
FIG. 17 is a schematic diagram of a road-level road network of a five-way intersection area according to an embodiment of the present invention.

FIG. 17 is a schematic diagram of a road-level road network of the intersection area of the five-way intersection P shown in FIG. 8. Road links 808, 809, and 811 to 818 shown in FIG. 17 are the road links in the intersection area of the five-way intersection P that are obtained in step 101. Points H, I, J, K, and M are intersection nodes, and intra-intersection links are 819 to 823.

For the right-hand traffic rule, the road link 808 of the road A in FIG. 17 is an entry link for the five-way intersection P and the road link 809 of the road A is an exit link for the five-way intersection P. Similarly, it can be learned that the road links 812, 814, 816, and 818 are entry links for the five-way intersection P and the road links 811, 813, 815, and 817 are exit links for the five-way intersection P.

For the left-hand traffic rule, the road link 808 of the road A in FIG. 17 is an exit link for the five-way intersection P and the road link 809 of the road A is an entry link for the five-way intersection P. Similarly, it can be learned that the road links 812, 814, 816, and 818 are exit links for the five-way intersection P and the road links 811, 813, 815, and 817 are entry links for the five-way intersection P.

Construction of the intersection node H is used as an example to describe a method for calculating coordinates of an intersection node obtained by extending a road link according to a course of a road.

In an example of the right-hand traffic rule, as shown in FIG. 17, an extension line of the entry link 808 of the road A in the intersection plane 805 and an extension line, in the intersection plane 805, of the exit link 813 of a road B counterclockwise adjacent to the road A intersect at a point H, and the point H is an intersection node. The extension line of the entry link 808 of the road A in the intersection plane 805 is an extension line of the entry link 808 made according to the course AO of the road A, and the extension line of the exit link 813 of the road B in the intersection plane 805 is an extension line of the exit link 813 made according to the course BO of the road B.

An intersection point A of the entry link 808 of the road A and the intersection plane 805 is $A_1$ $(p_1, q_1)$, and a direction angle of the course AO of the road A is α. An intersection point of the intersection plane 805 and the exit link 811 of the road B counterclockwise adjacent to the road A is $B_1$ $(p_2, q_2)$, and a direction angle of the course BO of the road B is β. The extension line of the entry link 808 of the road A is made in the intersection plane 805 according to the course AO of the road A. To be specific, the extension line is made by using the intersection point $A_1$ $(p_1, q_1)$ of the entry link 808 and the intersection plane 805 as a startpoint, and a direction angle of the extension line is α. An extension line of the exit link 811 of the road A is made in the intersection plane 805 according to the course BO of the road B. To be specific, the extension line is made by using the intersection point $B_1$ $(p_2, q_2)$ of the exit link 808 and the intersection plane 805 as a startpoint, and a direction angle of the extension line is β.

In another embodiment of the present invention, endpoints of the entry link 808 and the exit link 811 in the intersection area may be used as startpoints of extension lines of the entry link 808 and the exit link 811.

A point on the extension line of the entry link 808 of the road A is set to $H_1$ $(X_1, Y_1)$, where $Y_1=q_1+(X_1-p_1)\times\tan\alpha$.

A point on the extension line of the exit link 811 of the road B is set to $H_2$ $(X_2, Y_2)$, where $Y_2=q_2+(X_2-p_2)\times\tan\beta$.

Coordinates of an intersection point H of the two extension lines are set to H(x, y), and solutions of the following equation are the coordinates of the intersection point H:

$$\begin{cases} y = q_1 + (x - p_1) \times \tan\alpha \\ y = q_2 + (x - p_2) \times \tan\beta \end{cases}$$

According to the foregoing method, intersection points of extension lines, in the intersection plane 805, that are of entry links of other roads and exit links of roads counterclockwise adjacent to the other roads and that are made according to corresponding road courses of the other roads may be sequentially calculated: coordinates of an intersection point I at which an extension line of the entry link 812 of the road B intersects with an extension line of the exit link 813 of the road C; coordinates of an intersection point J at which an extension line of the entry link 814 of the road C intersects with an extension line of the exit link 815 of the road D; coordinates of an intersection point K at which an extension line of the entry link 816 of the road D intersects with an extension line of the exit link 817 of the road E; and coordinates of an intersection point M at which an extension line of the entry link 818 of the road E intersects with an extension line of the exit link 809 of the road A. Finally, the coordinates of the intersection nodes H, I, J, K, and M are each obtained.

The intersection node H becomes a new endpoint of each of the road links 808 and 811, and the coordinates of the intersection node H are recorded in road link data of the road links 808 and 811. Similarly, the intersection nodes I, J, K, and M are respectively new endpoints of road links connected by the intersection nodes, and the coordinates of the intersection nodes I, J, K, and M are respectively recorded in data of the road links connected by the intersection nodes.

The intersection nodes H, J, K, and M are connected in sequence to form the intra-intersection links 819 to 823, so as to form a road-level road network of the five-way intersection P. Coordinates of an intersection node are coordinates of an endpoint of an intra-intersection represent geometric data of the intra-intersection link, and indicate a location of the intra-intersection link. The coordinates also represent topology data of the intra-intersection link, and indicate a connection relationship between two endpoints of the intra-intersection link. Any entry link may be connected to any exit link by using an intersection node or by using an intersection node and an intra-intersection link. The road-level road network reflects traffic of straight going and left and right turning between roads in an intersection area.

According to a line drawing rule of drawing from left to right and from bottom to top, a line drawing direction of each intra-intersection link may be known.

In an example of the intra-intersection link 823, a line drawing direction of the intra-intersection link 823 is $\overrightarrow{HM}$. For the right-hand traffic rule, a traffic direction of the intra-intersection link 823 is $\overrightarrow{MH}$ and is opposite to the line drawing direction, and therefore the traffic direction of the intra-intersection link 823 is recorded as a reverse direction. Data of the intra-intersection link 823 may be recorded as follows: an ID of the intra-intersection link 823, points coordinates (coordinates of the point H and coordinates of the point M) that are recorded in the line drawing direction, and the traffic direction, namely, the reverse direction.

For the left-hand traffic rule, a traffic direction of the intra-intersection link 823 is $\overrightarrow{MH}$ and is consistent with a line drawing direction, and therefore the traffic direction of the intra-intersection link is recorded as a forward direction. Data of the intra-intersection link 823 may be recorded as follows: an ID of the intra-intersection link 823, points coordinates (coordinates of the point M and coordinates of the point H) that are recorded in the line drawing direction, and the traffic direction, namely, the forward direction.

Road network data of an intersection area may include data of an intersection node in the intersection area and data of an intra-intersection link in the intersection area.

According to the method for generating road network data of an intersection area provided in the embodiments of the present invention, a problem that an excessively large amount of road network data and excessively large quantities of intersection nodes and intra-intersection links are automatically constructed in a multi-way intersection may be resolved. A road-level road network constructed for a multi-way intersection is simple and efficient. There are relatively small quantities of intersection nodes and intra-intersection links in the road network data generated based on this solution, so that a calculation time generated when the road network data is used for path planning is decreased, a volume of the entire road network data is decreased, and a performance indicator such as a request delay of the road network data is greatly increased.

Figure 18:
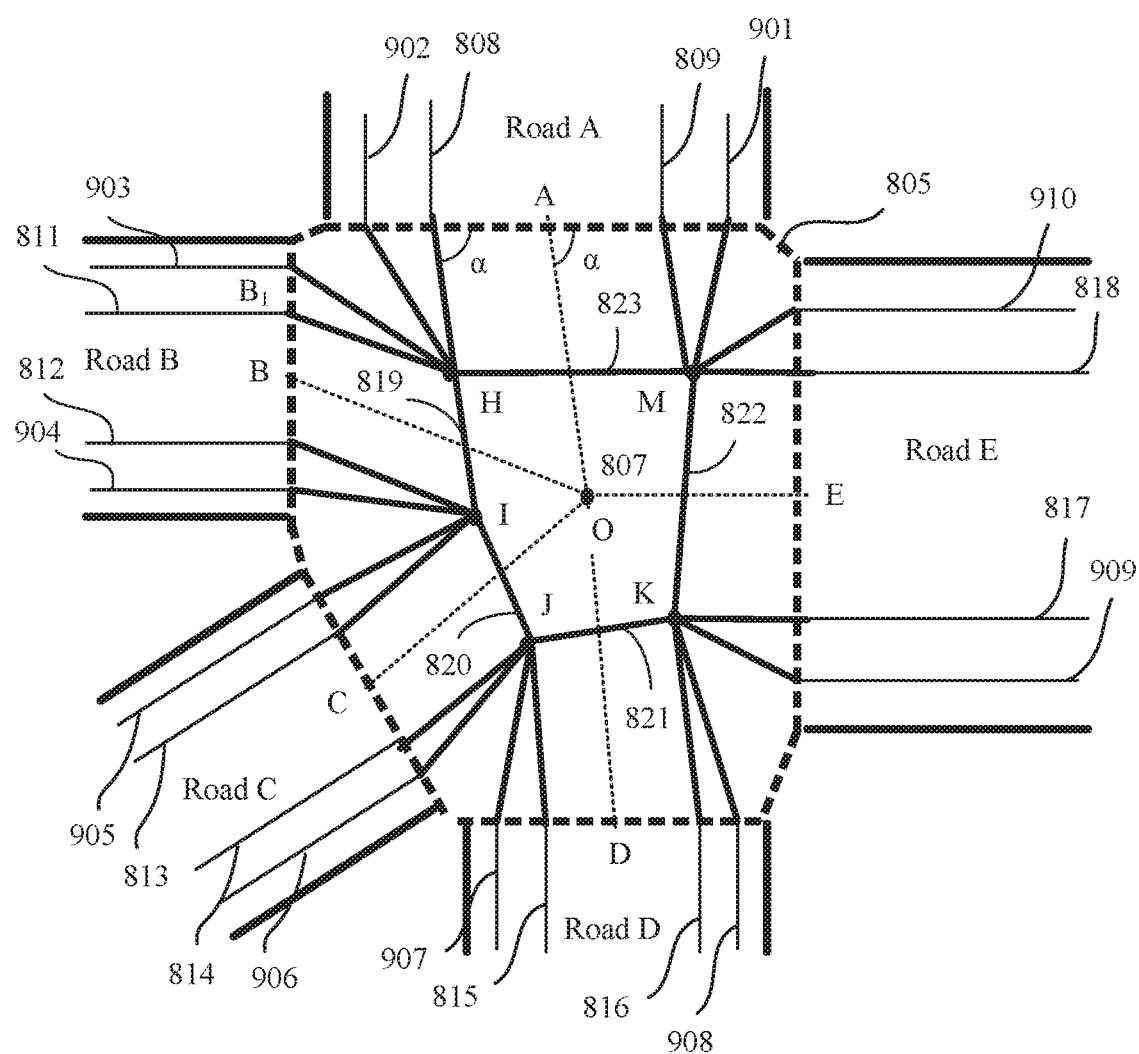
FIG. 18 is a schematic diagram of a road-level road network of a five-way intersection area according to an embodiment of the present invention.

In another embodiment of the present invention, when there is a main road and a service road in the road, the road link of the road is a road link of the main road in the road, and an extension line of a road link of the service road is a line extended from the road link of the service road to an intersection node on an extension line of the road link of the main road in the same road. A road may include a main road and a service road, and correspondingly have road links of the main road and road links of the service road. An intersection node is an intersection point generated when extension lines, of road links of the main road, made according to a course of the road intersect. After the intersection node is generated, the road link of the service road and the intersection node are connected. Finally, intersection nodes are connected in sequence to form an intra-intersection link. Assuming that the roads A, B, C, D, and E connected by the five-way intersection P shown in FIG. 8 each have a main road and a service road, FIG. 18 shows a schematic diagram of a corresponding road-level road network topology of the intersection area. The road links 808, 809, and 811 to 818 are road links of the main road, and road links 901 to 910 are road links of the service road. The intersection nodes H, I, J, K, and M respectively become new endpoints of road links of the service road that are connected by the intersection nodes, and coordinates of the intersection nodes I, J, K, and M are respectively recorded in data of the road links of the service road that are connected by the intersection nodes. Without increasing a quantity of intersection nodes, road types of the main road and the service road are considered, so that the generated road-level road network topology is more refined and accurate.

Figure 11:
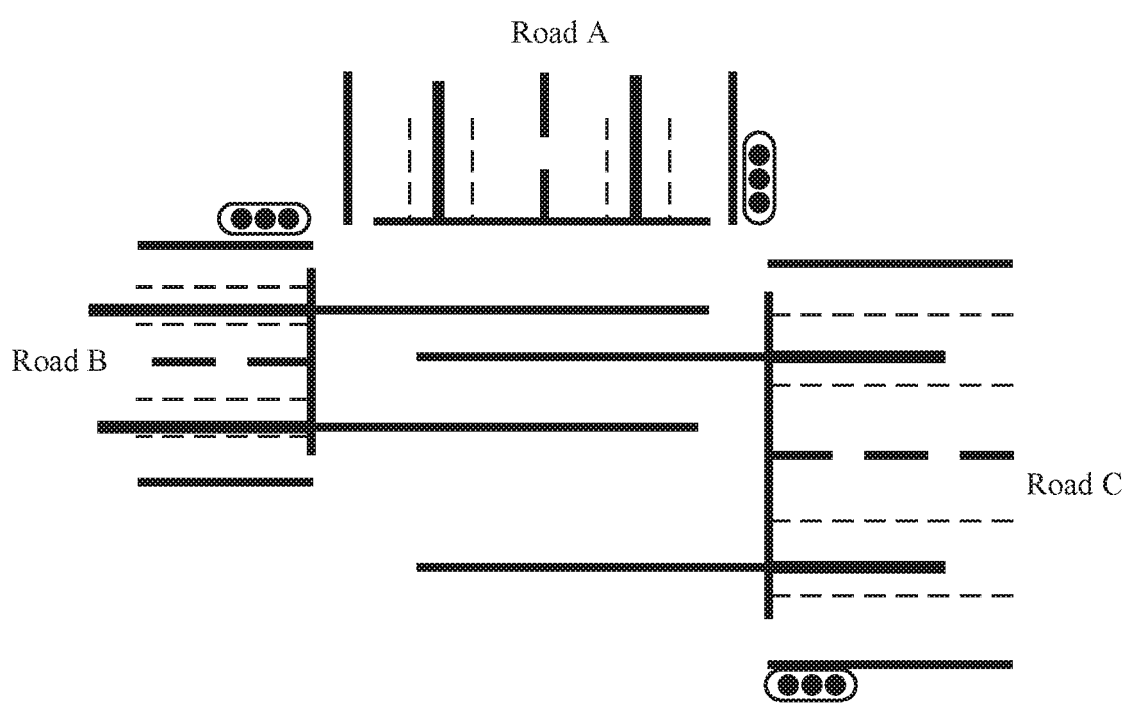
FIG. 11 is a schematic diagram of a three-way intersection according to an embodiment of the present invention.
Figure 19:
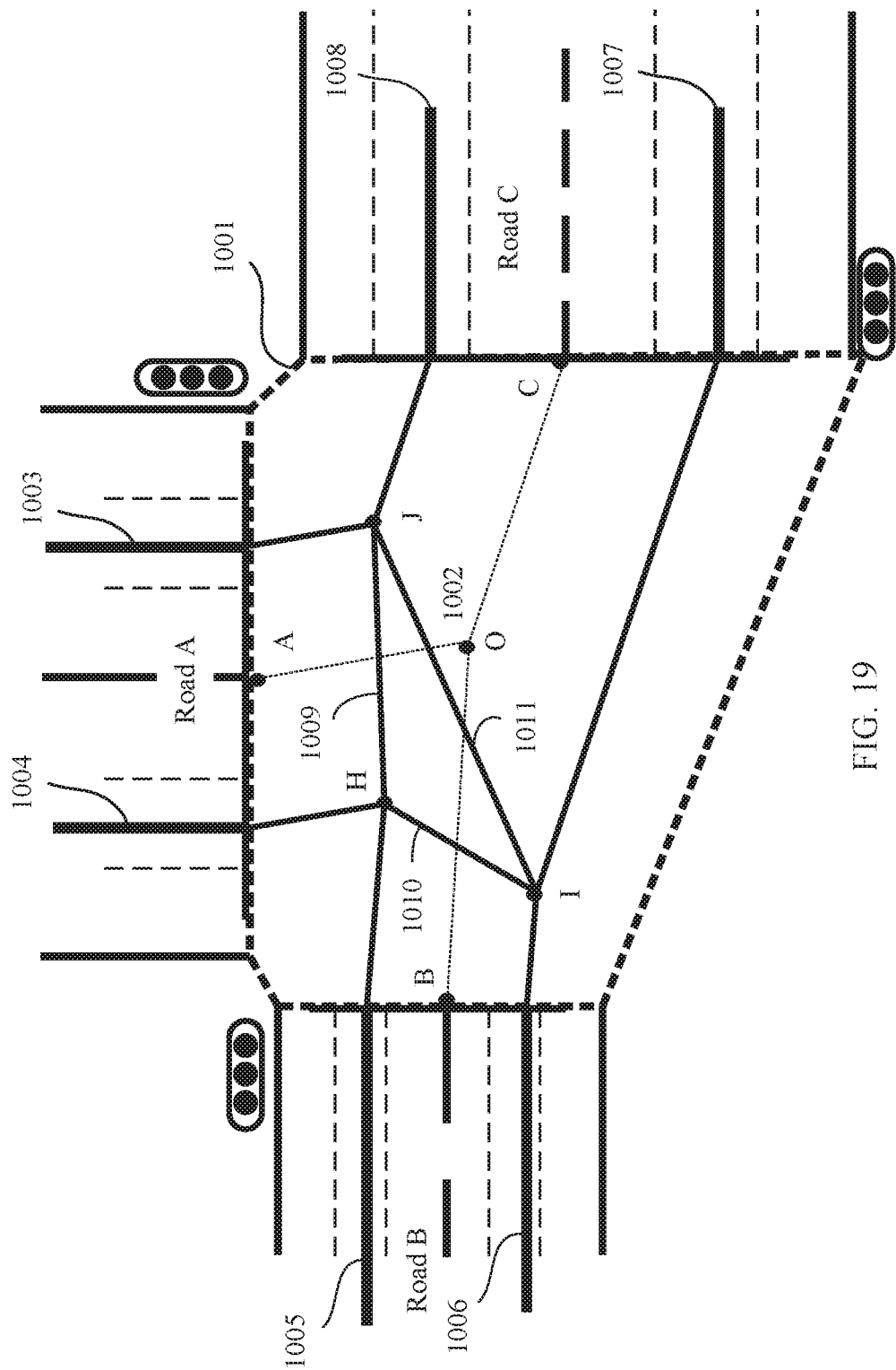
FIG. 19 is a schematic diagram of a road-level road network of a three-way intersection area according to an embodiment of the present invention.

The method for generating road network data of an intersection area provided in the embodiments of the present invention is further applicable to an irregular intersection (a three-way intersection) shown in FIG. 11, and FIG. 19 shows a road-level road network constructed for the three-way intersection based on the method for generating road network data of an intersection area provided in the embodiments of the present invention. An intersection plane of the three-way intersection is 1001, and a geometric gravity center point of the intersection plane is 1002, road links are 1003 to 1008, and traffic center points of roads A, B, and C are respectively points A, B, and C, courses of the roads A, B, and C are respectively AO, BO, and CO, and intersection points of extension lines that are of the road links of adjacent roads and that are made according to the courses of the roads are intersection nodes H, I, and J. Intra-intersection links 1009 to 1011 are formed. According to the method for generating road network data of an intersection area provided in the embodiments of the present invention, a problem of road network establishment of special-shaped intersections such as a multi-way intersection and an irregular intersection may be universally resolved, thereby effectively resolving a problem of automatic establishment of a road network of an intersection area.

The method for generating road network data of an intersection area provided in the embodiments of the present invention may further include the following step:

Step 106: Calculate data of a virtual lane connection line in the intersection area. Lane-level road network data is generated based on the road-level road network data of the intersection area, and this may specifically include the following steps.

S601. Calculate turning of a road to another road after crossing an intersection.

As shown in FIG. 17, an example of calculating turning of the road D to the road B after crossing the five-way intersection P under the right-hand traffic rule is used.

Under the right-hand traffic rule, based on traffic directions of a road link and an intra-intersection link, a vehicle from the road D to the road B after crossing the five-way intersection P needs to enter the intersection area from the road link 816, then sequentially crosses the intersection node K, the intra-intersection link 822, the intersection node M, the intra-intersection link 823, and the intersection node H, and exits the intersection area from the road link 811.

Under the right-hand traffic rule, a counterclockwise direction is a vehicle traffic direction represented by an intra-intersection link. Therefore, a vector $\overline{HI}$ represents a traffic direction of the road link 819, a vector $\overline{IJ}$ corresponds to a traffic direction of the road link 820, a vector $\overline{JK}$ corresponds to a traffic direction of the road link 821, a vector $\overline{KM}$ corresponds to a traffic direction of the road link 822, and a vector $\overline{MH}$ corresponds to a traffic direction of the road link 823.

The turning for entering from the road D to the road B may be determined based on a cross product of vectors respectively corresponding to the intra-intersection link 822 and the intra-intersection link 823.

Figure 20:
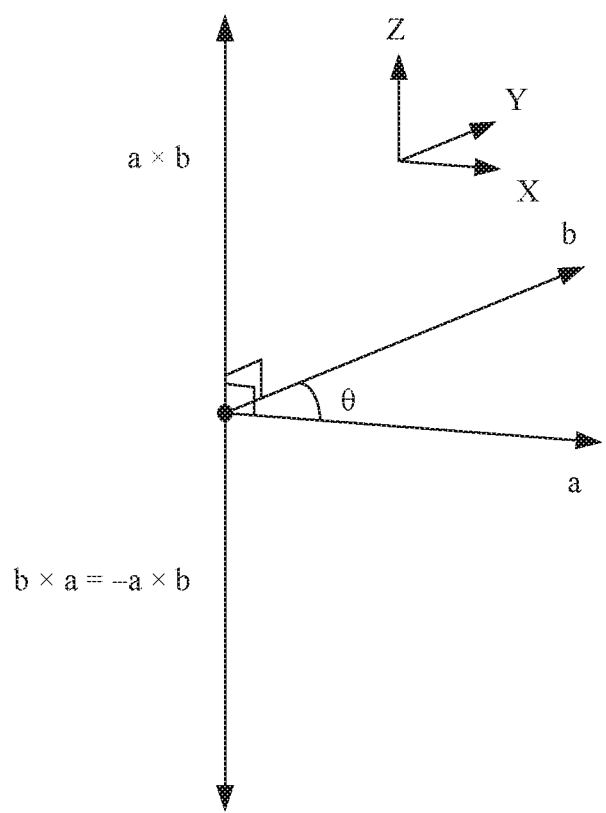
FIG. 20 is a schematic diagram of a cross product vector according to an embodiment of the present invention.

As shown in FIG. 20, a cross product from a vector a to a vector b may be a×b, θ represents an angle between the vector a and the vector b, and 0°≤θ≤180°, A direction of a cross product vector a×b is determined according to a right-hand rule, and it is assumed that a coordinate system at which the vectors are located meets the right-hand rule. When four fingers of a right hand turn from the vector a to the vector b at a rotation angle that does not exceed 180°, an erected thumb points to the direction of the cross product vector a×b. The cross product vector a×b is a vector perpendicular to a plane at which the vectors a and b are located. If the generated cross product vector a×b is in a positive axis of a Z-axis of a three-dimensional coordinate system, turning from the vector a to the vector b is considered as counterclockwise turning. If the generated cross product vector a×b is in a negative axis of the Z-axis of the three-dimensional coordinate system, turning from the vector a to the vector b is considered as clockwise turning.

The vector $\overline{KM}$ corresponds to the road link 822 and the vector $\overline{MH}$ corresponds to the road link 823. A vector cross product $\overline{KM} \times \overline{MH}$ of the two vectors corresponding to two intra-intersection links is calculated, and it is learned that turning from the vector $\overline{KM}$ to the vector $\overline{MH}$ is counterclockwise. To be specific, the road D turns left to enter the road B after crossing the intersection.

S602. Obtain data of a lane link of each road in the intersection area based on a relationship between a lane and a road.

Figure 21:
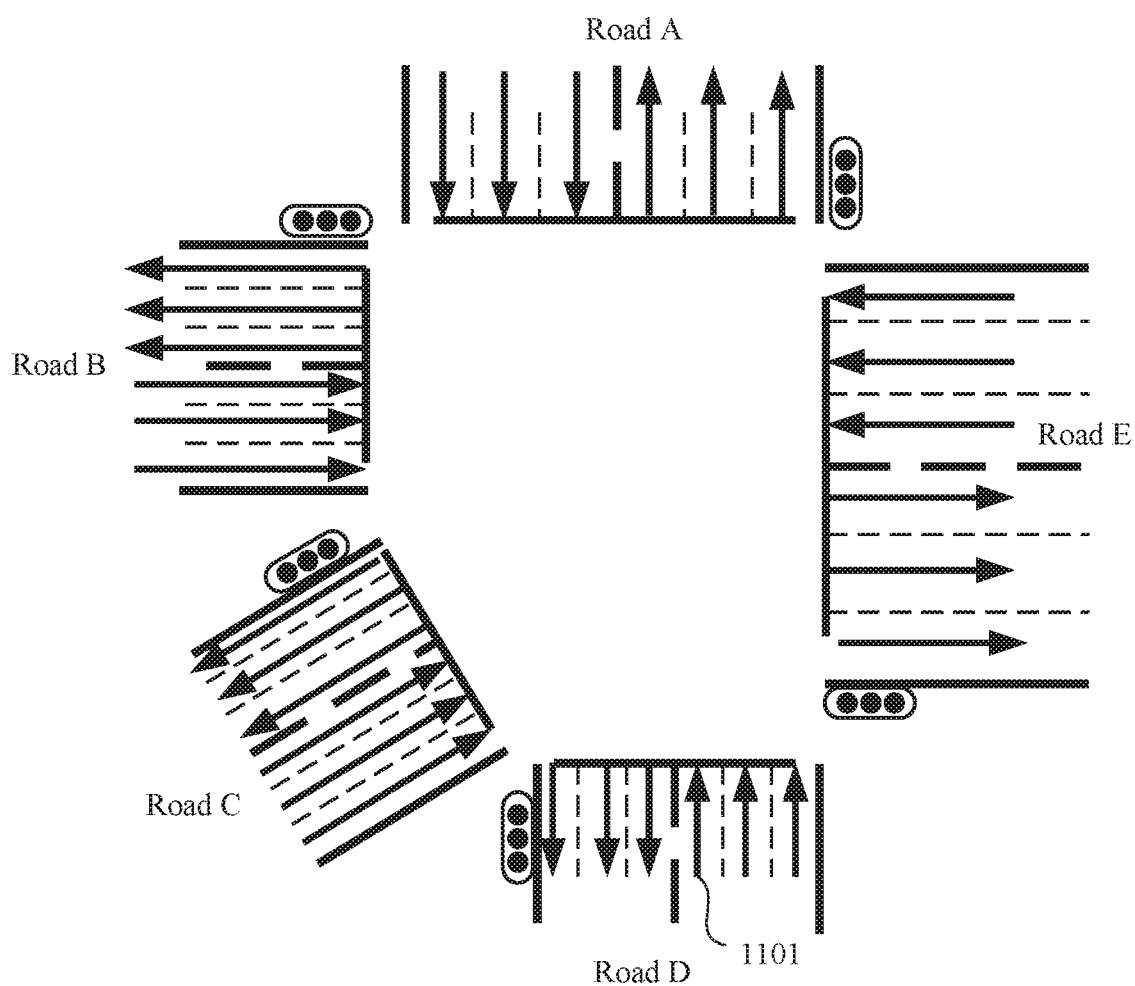
FIG. 21 is a schematic diagram of lane links corresponding to roads connected by a five-way intersection according to an embodiment of the present invention.

Based on the relationship between a lane and a road, lane link data corresponding to roads connected by the five-way intersection P is obtained. FIG. 21 is a schematic diagram of lane links corresponding to roads connected by the five-way intersection P under the right-hand traffic rule, and arrows on the lane links represent traffic directions of the lane links. A lane link 1101 is an entry link of the road D for the five-way intersection P.

S603. Calculate a virtual lane connection line in the intersection area.

The turning from the road D to the road B obtained in the foregoing steps is left turning. It may be determined, based on a lane turning attribute in the lane link data, that the lane link 1101 of the road D is a left-turn lane. Virtual lane connection lines 1102, 1104, and 1106 separately, connecting the lane link 1101 and lane links 1103, 1105, and 1107 of the road B may be calculated according to a second-order Bessel function. FIG. 22 is a schematic diagram of some virtual lane connection lines in the five-way intersection P.

Specifically, coordinates of an endpoint A of the lane link 1101 and coordinates of endpoints B, C, and D corresponding to the lane link 1103, 1105, and 1107 are known. An endpoint of one of the lane links and an endpoint of another lane link in the lane links are connected by a second-order Bessel curve, and a calculated curve is a virtual lane connection line.

Figure 23:
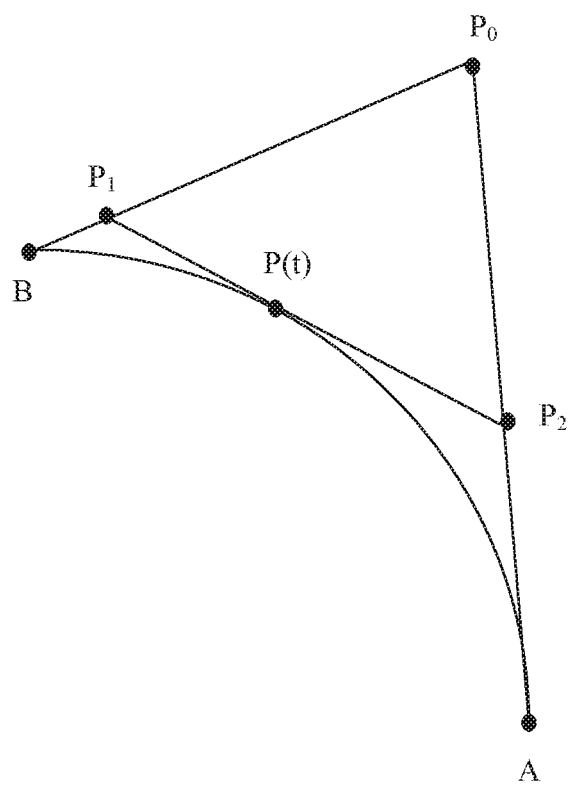
FIG. 23 is a schematic diagram of calculation of a second-order Bessel curve according to an embodiment of the present invention.

In an example of calculating the virtual lane connection line 1102, FIG. 23 is a schematic diagram of calculation of a second-order Bessel curve. An endpoint of the lane link 1101 is A, an endpoint of the lane link 1103 is B, and a virtual auxiliary point $P_0$ is set.

A line segment is described by a continuity point $P_1$ from B to $P_0$;

a line segment is described by a continuity point $P_2$ from A to $P_0$; and a second-order Bessel curve is described by a continuity point P(t) from A to B.

$$P(t)=(1-t)^2A+2t(1-t)P_0+t^2B, \text{ where } t\square[0,1]$$

The curve represented by P(t) is the virtual lane connection line 1102.

The step of generating the lane-level road network data of the intersection area may be completed by the road network calculation unit 503 or may be completed by another unit in the module 403 for generating road network data of an intersection area.

The road network data generated by the map data generation apparatus 302 may include the road network data of the intersection area generated by the module 403 for generating road network data of an intersection area and the lane link data and the road link data generated by the module 402 for generating road network data of a road segment area. The map data generation apparatus 302 may further generate display map data and search map data, or another type of map data.

Figure 24:
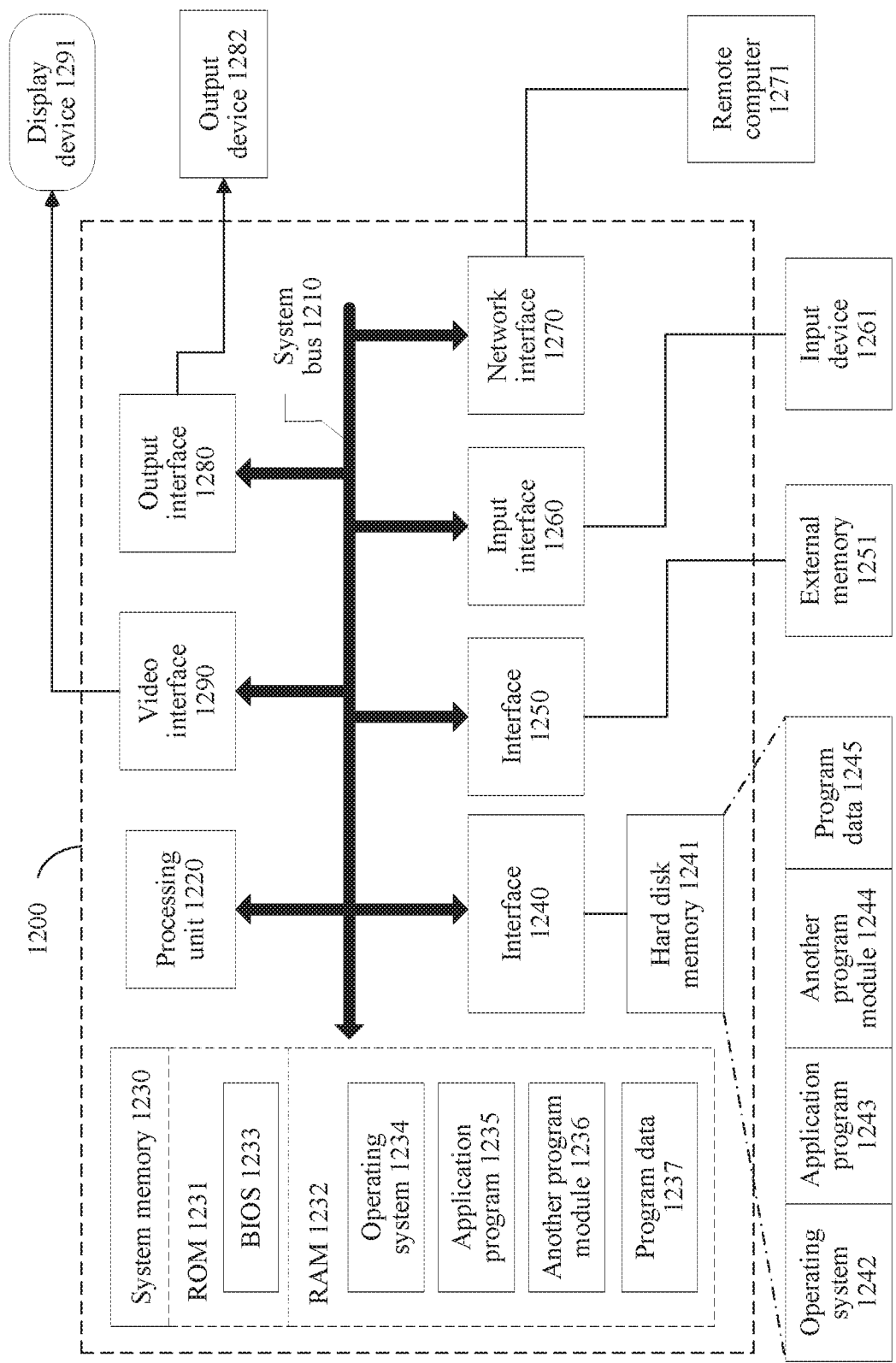
FIG. 24 is a schematic diagram of a logical structure of a computer system according to an embodiment of the present invention.

FIG. 24 is a schematic diagram of a logical structure of a computer system 1200 according to an embodiment of the present invention. The computer system 1200 includes:

a processing unit 1220, a system memory 1230, and a system bus 1210. The system bus 1210 couples various types of system elements including the system memory 1230 to the processing unit 1220. The system bus 1210 may be any of some types of buses. These buses may include a memory bus or a memory controller, peripheral bus, and a local bus using a type of bus. The buses may include an Industry Standard Architecture (ISA) bus, a Micro Channel Architecture (MCA) bus, an Extended ISA bus, a Video Electronics Standards Association (VESA) local bus, a Peripheral Component Interconnect (PCI) bus, and the like.

The system memory 1230 includes a volatile memory and a nonvolatile memory, for example, a read-only memory (ROM) 1231 and a random access memory (RAM) 1232. A basic input/output system 1233 (BIOS) is usually stored in the ROM 1231 and includes a basic routine. The basic routine contributes to information transmission between elements in a management node. The RAM 1232 usually includes a data module and/or a program module, and the module may be accessed and/or operated immediately by the processing unit 1220, for example, an operating system 1234, an application program 1235, another program module 1236, and program data 1237.

The computer system 1200 may also include another detachable/non-detachable storage medium and another volatile/nonvolatile storage medium. For example, a hard disk memory 1241 may be a non-detachable, nonvolatile, readable, and writable magnetic medium. For another example, an external memory 1251 may be various types of detachable and nonvolatile external memories, such as a compact disc, a magnetic disk, a flash memory, and a removable hard disk. The hard disk memory 1241 is usually connected to the system bus 1210 by using a non-detachable storage interface (such as an interface 1240: an irremovable nonvolatile storage interface), and the external memory 1251 is usually connected to the system bus 1210 by using a detachable storage interface (such as an interface 1250: a removable nonvolatile storage interface) The hard disk memory 1241 may be configured to store an operating system 1242, an application program 1243, another program module 1244, and program data 1245. It should be noted that these elements may be the same as or different from the operating system 1234, the application program 1235, the another program module 1236, and the program data 1237.

A user may enter a command or information by using various types of input devices 1261 to manage the computer system 1200. The various types of input devices are usually connected to the processing unit 1220 through a user input interface 1260, and the user input interface 1260 is coupled to the system bus 1210, or may be connected to the system bus 1210 through another interface, for example, a parallel interface or a universal serial bus (USB). A display device 1291 may also be connected to the system bus 1210 through an interface (such as a video interface 1290). In addition, the computer system 1200 may also include various types of periphery output devices 1282, and the periphery output devices 1282 are connected through an output interface 1280 or the like.

The method in any of the foregoing embodiments or a function of a logic module in the foregoing embodiment may be implemented by the processing unit 1220 by reading code or readable command, in one or more storage media, stored in the computer system 1200.

The processing unit 1220 may be a single-core processor or a multi-core processor. When the processing unit 1220 is the multi-core processor, the method provided in the foregoing embodiments may run on one core, or different function units may be distributed on different cores. The processing unit 1220 may also include a microprocessor/coprocessor and the like.

The described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawing of the apparatus embodiments provided by the present invention, connection relationships between modules indicate that the modules have communication connections with each other, which may be specifically implemented as one or more communications buses or signal cables. A person of ordinary skill in the art may understand and implement the embodiments of the present invention without creative efforts.

What is claimed is:

1. A method for generating road network data of an intersection area, wherein the intersection area connects a plurality of roads, and the method comprises:
   receiving, from one or more sensors, data of a road link of each of the plurality of roads, wherein the road link comprises an entry link and an exit link, and the data of the road link comprises coordinates of points forming the road link;
   calculating, based on the data of the road link of each of the plurality of roads, data of an intersection node in the intersection area and data of an intra-intersection link in the intersection area, wherein the data of the intersection node comprises coordinates of the intersection node, and the data of the intra-intersection link comprises coordinates of endpoints of the intra-intersection link, and wherein the calculating comprises:
      calculating coordinates of an intersection point of an extension line of the entry link of each road and an extension line of an exit link of a neighboring road, wherein the coordinates of the intersection point are the coordinates of the intersection node, and two intersection nodes in sequence are the endpoints of the intra-intersection link, wherein the calculating coordinates of an intersection point of an extension line of the entry link of each road and an extension line of an exit link of a neighboring road comprises making extension lines of the entry link and the exit link of each road in an intersection plane of the intersection area according to a course of the road, wherein the course of the road is a direction from a traffic center point of the road to a traffic center point in the intersection plane; and wherein
         the neighboring road is a road counterclockwise adjacent to the road, and a right-hand traffic rule is followed in a country or region in which the intersection area is located; or
         the neighboring road is a road clockwise adjacent to the road, and a left-hand traffic rule is followed in a country or region in which the intersection area is located; and
   performing automatic driving or intelligent assistant driving by using an electronic map that is generated based on the calculated data of the intersection node in the intersection area and the calculated data of the intra-intersection link in the intersection area.

2. The method according to claim 1, wherein the course of each road is a direction from the traffic center point of the road to a geometric gravity center of the intersection plane, and the method further comprises:
   obtaining surface feature geometric data of the intersection area;
   calculating the intersection plane of the intersection area based on the surface feature geometric data of the intersection area, and calculating coordinates of the geometric gravity center of the intersection plane; and calculating coordinates of the traffic center point of each road based on the data of the road link of the road.

3. The method according to claim 1, wherein when there is a main road and a service road in the road, the road link of the road is a road link of the main road in the road, and an extension line of a road link of the service road is a line extended from the road link of the service road to an intersection node on an extension line of the road link of the main road in the same road.

4. The method according to claim 1, wherein when there is a main road and a service road in the road, the road link of the road is a road link of the main road in the road, and an extension line of a road link of the service road is a line extended from the road link of the service road to an intersection node on an extension line of the road link of the main road in the same road.

5. A computer system, wherein the computer system comprises a processor and a memory, the memory is configured to store a computer program, and the processor is configured to read the computer program from the memory, and enable the computer system to perform operations for generating road network data of an intersection area, wherein the intersection area connects a plurality of roads, and the operations comprise:
receiving, from one or more sensors, data of a road link of each of the plurality of roads, wherein the road link comprises an entry link and an exit link, and the data of the road link comprises coordinates of points forming the road link;
calculating, based on the data of the road link of each of the plurality of roads, data of an intersection node in the intersection area and data of an intra-intersection link in the intersection area, wherein the data of the intersection node comprises coordinates of the intersection node, and the data of the intra-intersection link comprises coordinates of endpoints of the intra-intersection link, and wherein the calculating comprises:
calculating coordinates of an intersection point of an extension line of the entry link of each road and an extension line of an exit link of a neighboring road, wherein the coordinates of the intersection point are the coordinates of the intersection node, and two intersection nodes in sequence are the endpoints of the intra-intersection link, wherein the calculating coordinates of an intersection point of an extension line of the entry link of each road and an extension line of an exit link of a neighboring road comprises making extension lines of the entry link and the exit link of each road in an intersection plane of the intersection area according to a course of the road, wherein the course of the road is a direction from a traffic center point of the road to a traffic center point in the intersection plane; and wherein
the neighboring road is a road counterclockwise adjacent to the road, and a right-hand traffic rule is followed in a country or region in which the intersection area is located; or
the neighboring road is a road clockwise adjacent to the road, and a left-hand traffic rule is followed in a country or region in which the intersection area is located; and
performing automatic driving or intelligent assistant driving by using an electronic map that is generated based on the calculated data of the intersection node in the intersection area and the calculated data of the intra-intersection link in the intersection area.

6. The computer system according to claim 5, wherein the course of each road is a direction from the traffic center point of the road to a geometric gravity center of the intersection plane, and the operations further comprise:
obtaining surface feature geometric data of the intersection area;
calculating the intersection plane of the intersection area based on the surface feature geometric data of the intersection area, and calculating coordinates of the geometric gravity center of the intersection plane; and
calculating coordinates of the traffic center point of each road based on the data of the road link of the road.

7. A non-transitory computer-readable storage medium, wherein the non-transitory computer readable storage medium stores a computer program used to perform operations for generating road network data of an intersection area, wherein the intersection area connects a plurality of roads, and the operations comprise:
receiving, from one or more sensors, data of a road link of each of the plurality of roads, wherein the road link comprises an entry link and an exit link, and the data of the road link comprises coordinates of points forming the road link;
calculating, based on the data of the road link of each of the plurality of roads, data of an intersection node in the intersection area and data of an intra-intersection link in the intersection area, wherein the data of the intersection node comprises coordinates of the intersection node, and the data of the intra-intersection link comprises coordinates of endpoints of the intra-intersection link, and wherein the calculating comprises:
calculating coordinates of an intersection point of an extension line of the entry link of each road and an extension line of an exit link of a neighboring road, wherein the coordinates of the intersection point are the coordinates of the intersection node, and two intersection nodes in sequence are the endpoints of the intra-intersection link, wherein the calculating coordinates of an intersection point of an extension line of the entry link of each road and an extension line of an exit link of a neighboring road comprises making extension lines of the entry link and the exit link of each road in an intersection plane of the intersection area according to a course of the road, wherein the course of the road is a direction from a traffic center point of the road to a traffic center point in the intersection plane; and wherein
the neighboring road is a road counterclockwise adjacent to the road, and a right-hand traffic rule is followed in a country or region in which the intersection area is located; or
the neighboring road is a road clockwise adjacent to the road, and a left-hand traffic rule is followed in a country or region in which the intersection area is located; and
performing automatic driving or intelligent assistant driving by using an electronic map that is generated based on the calculated data of the intersection node in the intersection area and the calculated data of the intra-intersection link in the intersection area.

8. The medium according to claim 7, wherein the course of each road is a direction from the traffic center point of the road to a geometric gravity center of the intersection plane, and the operations further comprise:

obtaining surface feature geometric data of the intersection area;

calculating the intersection plane of the intersection area based on the surface feature geometric data of the intersection area, and calculating coordinates of the geometric gravity center of the intersection plane; and calculating coordinates of the traffic center point of each road based on the data of the road link of the road.

9. The medium according to claim 7, wherein when there is a main road and a service road in the road, the road link of the road is a road link of the main road in the road, and an extension line of a road link of the service road is a line extended from the road link of the service road to an intersection node on an extension line of the road link of the main road in the same road.

* * * * *